United States Patent
Komazawa

(10) Patent No.: US 9,858,514 B2
(45) Date of Patent: Jan. 2, 2018

(54) PRINT CONTROL APPARATUS, PRINT CONTROL METHOD, AND NON-TRANSITORY COMPUTER READABLE MEDIUM

(71) Applicant: FUJI XEROX CO., LTD., Tokyo (JP)

(72) Inventor: Hisao Komazawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/336,632

(22) Filed: Oct. 27, 2016

(65) Prior Publication Data

US 2017/0316292 A1 Nov. 2, 2017

(30) Foreign Application Priority Data

Apr. 28, 2016 (JP) .................................. 2016-090182

(51) Int. Cl.
*G06K 15/00* (2006.01)
*G06K 15/02* (2006.01)

(52) U.S. Cl.
CPC ....... *G06K 15/4065* (2013.01); *G06K 15/022* (2013.01); *G06K 15/1806* (2013.01); *G06K 15/1836* (2013.01); *G06K 2215/0014* (2013.01)

(58) Field of Classification Search
CPC ................................................ G06K 15/4065
See application file for complete search history.

(56) References Cited

U.S. PATENT DOCUMENTS

| 5,671,163 | A | * | 9/1997 | Iida | ......................... | B41J 11/42 |
| | | | | | | 399/343 |
| 6,525,843 | B1 | * | 2/2003 | Yu | ........................ | H04N 1/0402 |
| | | | | | | 358/406 |
| 6,832,352 | B1 | * | 12/2004 | Dooley | ................. | G06F 17/211 |
| | | | | | | 715/234 |
| 2008/0162629 | A1 | | 7/2008 | Ashida et al. | | |

FOREIGN PATENT DOCUMENTS

JP 2001-187651 A 7/2001
JP 2008-165329 A 7/2008

* cited by examiner

*Primary Examiner* — Ibrahim Siddo
(74) *Attorney, Agent, or Firm* — Oliff PLC

(57) ABSTRACT

A print control apparatus includes a receiving unit receiving a print instruction; a first converting unit converting a dimension of a sheet of paper specified in a first unit in the print instruction to a dimension in a second unit different from the first unit; a second converting unit converting the dimension in the second unit to a dimension in a third unit employed by a print apparatus; an acquiring unit acquiring, from the print apparatus, information regarding a standard dimension list in the third unit; a selecting unit selecting, from the information, a standard dimension that matches, within a preset tolerance range, the dimension in the third unit; a generating unit generating print data by processing the print instruction by using the selected dimension; and an output controller specifying the selected dimension to control output of the print apparatus on the basis of the print data.

14 Claims, 19 Drawing Sheets

FIG. 8
| NAME | SHORT SIDE (mm) | LONG SIDE (mm) | ORIENTATION |
|---|---|---|---|
| A6 | 105.0 | 148.0 | SEF |
| A5 | 148.0 | 210.0 | SEF |
|    |       |       | LEF |
| A4 | 210.0 | 297.0 | SEF |
|    |       |       | LEF |
| A3 | 297.0 | 420.0 | SEF |
| B6 | 128.0 | 182.0 | SEF |
| B5 | 182.0 | 257.0 | SEF |
|    |       |       | LEF |
| B4 | 257.0 | 364.0 | SEF |

FIG. 19
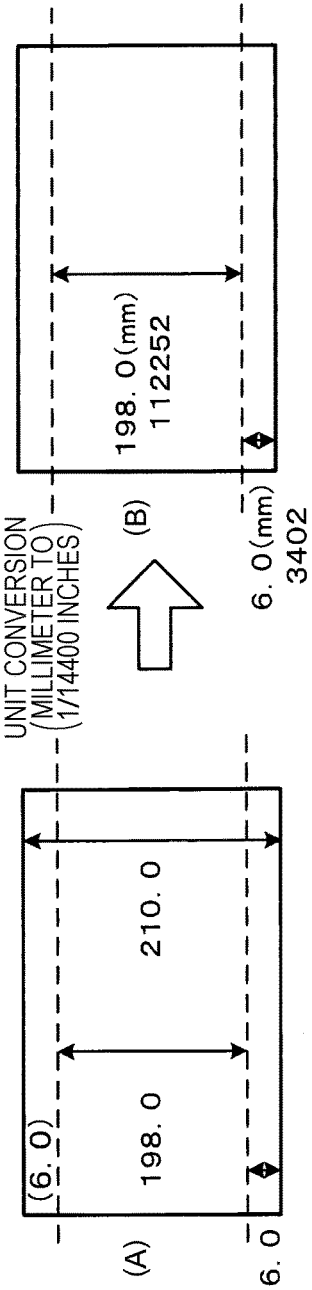
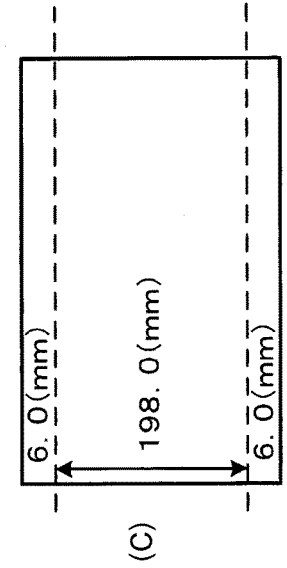

PRINT CONTROL APPARATUS, PRINT CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-090182 filed Apr. 28, 2016.

BACKGROUND (i) Technical Field

The present invention relates to a print control apparatus, a print control method, and a non-transitory computer readable medium.

(ii) Related Art

When developing a controller (print control apparatus) that controls operations of a print apparatus for business purposes, in order to enhance development efficiency, a common controller compatible with multiple types of machines having different functions may be developed in some cases, not a controller compatible with a specific type of machine.

Typically, a print apparatus for continuous form paper employs the inch as a unit for specifying a paper size or position for aftertreatment, whereas a print apparatus for cut form paper employs the millimeter (mm) as a unit for specifying a paper size or position for aftertreatment. Accordingly, a print job by which the print apparatus for continuous form paper is instructed to perform printing typically employs the inch as a unit for specification, and a print job by which the print apparatus for cut form paper is instructed to perform printing typically employs the millimeter as a unit for specification.

Accordingly, a common controller that is compatible with multiple different types of print apparatuses performs processing in a common size unit that is independent of the machine type of the print apparatus, eventually converts a value in the common size unit to a value in the size unit employed by the print apparatus that performs the print processing, and issues a print instruction to the print apparatus. As a result, such a controller first has to convert information regarding the paper size or position for aftertreatment that has been specified by a user to a value in the common size unit employed by the controller and then has to further convert the converted value in the common size unit to a value in the size unit employed by the print apparatus.

SUMMARY

According to an aspect of the invention, there is provided a print control apparatus including a receiving unit, a first converting unit, a second converting unit, an acquiring unit, a selecting unit, a generating unit, and an output controller. The receiving unit receives a print instruction. The first converting unit converts a dimension of a sheet of paper specified in a first unit in the print instruction received by the receiving unit to a dimension of a sheet of paper in a second unit that is different from the first unit. The second converting unit converts the dimension of the sheet of paper in the second unit to a dimension of a sheet of paper in a third unit, the dimension in the second unit having been obtained by the conversion by the first converting unit, the third unit being employed by a print apparatus that is to perform print processing. The acquiring unit acquires, from the print apparatus, information regarding a list of standard dimensions of sheets of paper in the third unit that is employed by the print apparatus. The selecting unit selects, from the information regarding the list of standard dimensions of sheets of paper acquired by the acquiring unit, a standard dimension of a sheet of paper that matches, within a preset range of tolerance, the dimension of the sheet of paper in the third unit obtained by the conversion by the second converting unit. The generating unit generates print data by processing the print instruction, received by the receiving unit, by using the standard dimension of the sheet of paper selected by the selecting unit. The output controller specifies the standard dimension of the sheet of paper selected by the selecting unit to control output of the print apparatus on the basis of the print data generated by the generating unit.

BRIEF DESCRIPTION OF THE DRAWINGS

Exemplary embodiments of the present invention will be described in detail based on the following figures, wherein:

FIG. 8 illustrates exemplary standard-paper-size list information;

FIG. 19 illustrates a specific exemplary case of specification for trimming the top and bottom for a print apparatus as an example of the process for specifying a position for aftertreatment according to the second exemplary embodiment.

DETAILED DESCRIPTION

Exemplary embodiments of the present invention will now be described below in detail with reference to the drawings.

First Exemplary Embodiment

Figure 1:
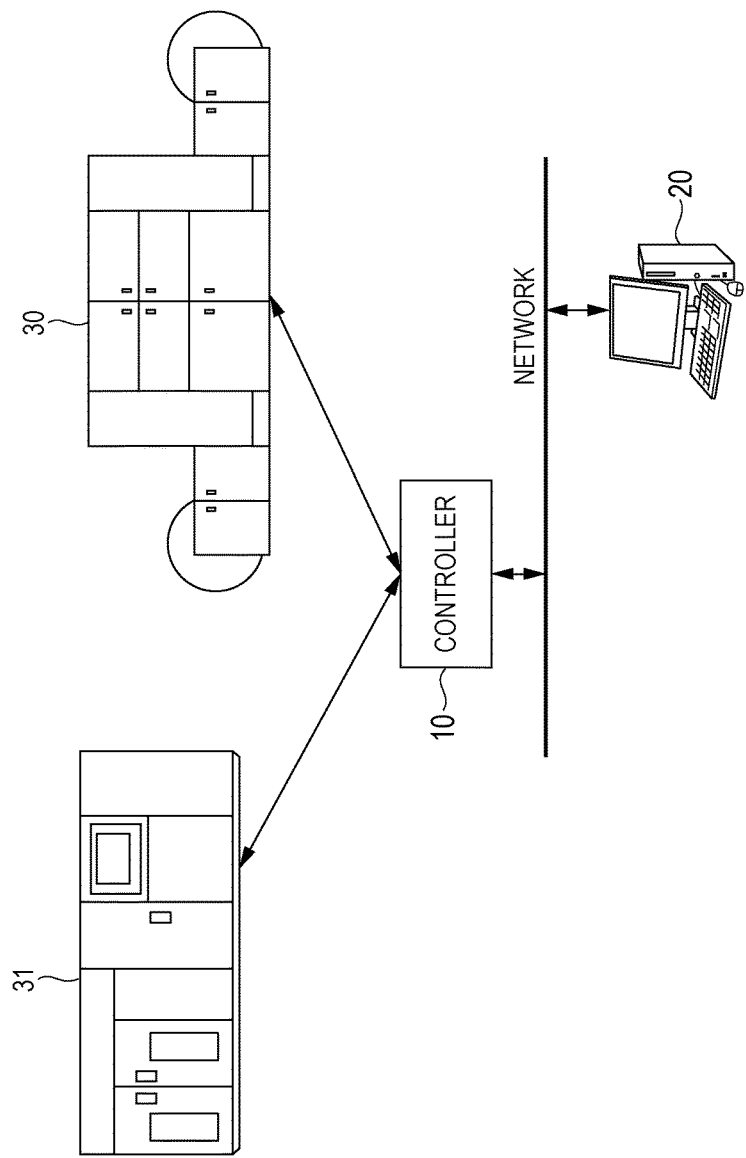
FIG. 1 illustrates an exemplary configuration of a print system according to a first exemplary embodiment of the present invention.

FIG. 1 illustrates an exemplary configuration of a print system according to a first exemplary embodiment of the present invention. This print system includes, as illustrated in FIG. 1, a print apparatus 30 that performs printing on continuous form paper or a print apparatus 31 that performs printing on cut form paper, a controller (print control apparatus) 10, and a terminal apparatus 20.

Here, the controller 10 according to this exemplary embodiment is not designed to be compatible with a specific print apparatus, but is configured to be compatible with multiple print apparatuses having different functions. Accordingly, the controller 10 is configured to enable both the print apparatus 30 and the print apparatus 31 to perform print processing, the print apparatus 30 performing printing on continuous form paper, the print apparatus 31 performing printing on cut form paper.

The terminal apparatus 20 generates a print job (print instruction) and transmits the print job to the controller 10 via a network. The controller 10 receives the print job transmitted from the terminal apparatus 20, generates rasterized print data on the basis of the print job and transfers the print data, thereby functioning as a print control apparatus that controls print operations of the print apparatus 30 and the print apparatus 31. Under control of the controller 10, the print apparatus 30 and the print apparatus 31 output images in accordance with the transferred print data on continuous form paper and cut form paper, respectively.

When the print data is transferred from the controller 10 to the print apparatus 30 and the print apparatus 31, it is necessary to specify the size of paper on which images are to be output, a position for aftertreatment, or the like.

However, the print apparatus 30 that performs print processing on continuous form paper typically employs the inch as a size unit, whereas the print apparatus 31 that performs print processing on cut form paper typically employs the millimeter (mm) as a size unit. In the instruction for print processing transmitted from the terminal apparatus 20 to the controller 10, the inch or millimeter may be used as the size unit.

Figure 2:
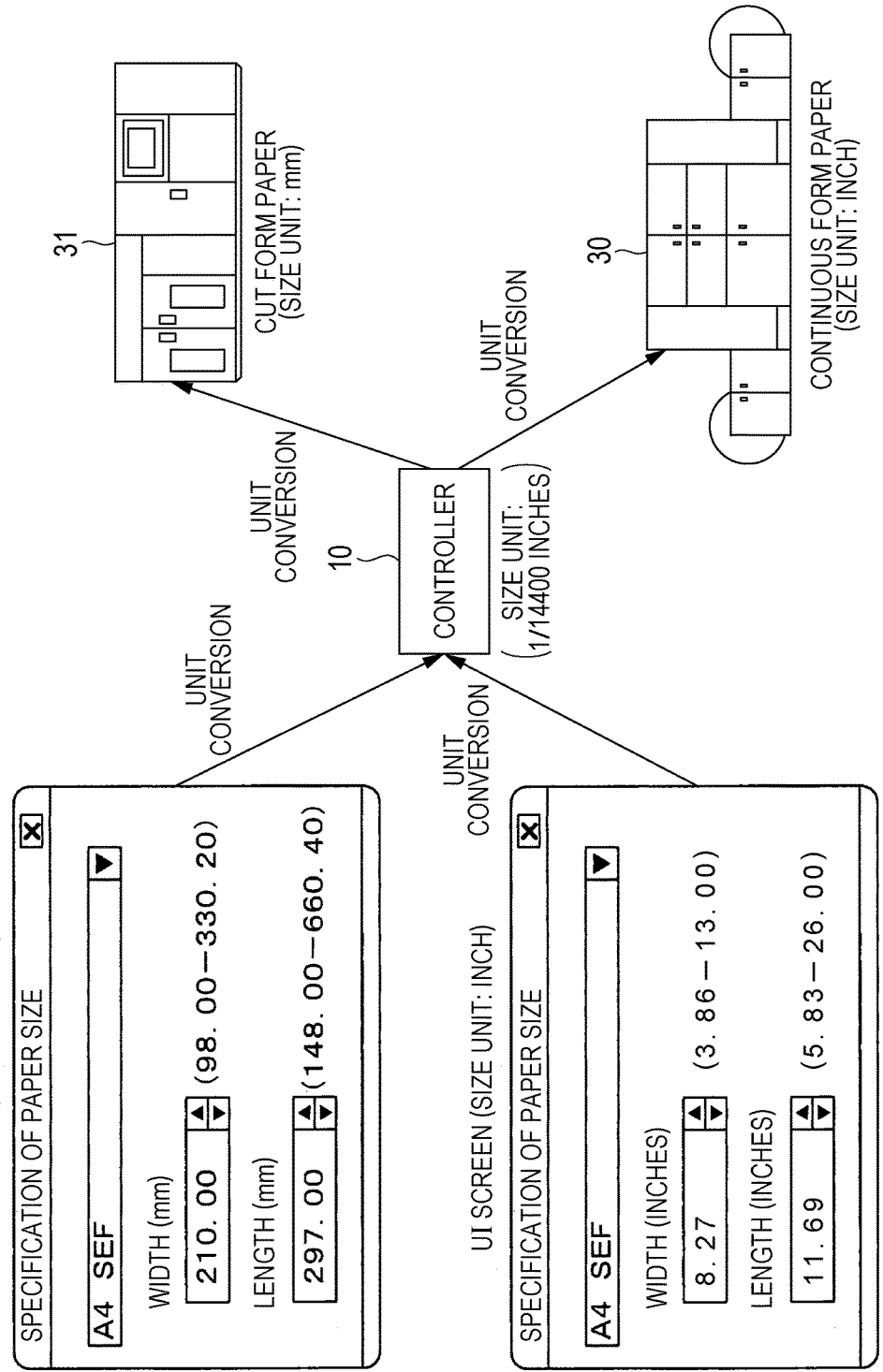
FIG. 2 illustrates how unit conversion is performed in the print system according to the first exemplary embodiment of the present invention.

Accordingly, in the controller 10 according to this exemplary embodiment, as illustrated in FIG. 2, the paper size (paper dimensions) in millimeters or inches specified by a user is converted to a paper size in a unit of $1/14400$ inches, which is the common unit employed by the controller 10, as temporary processing.

Then, if the destination of the print job to be transferred is the print apparatus 31, the controller 10 converts the paper size in a unit of $1/14400$ inches to a paper size in millimeters, which is the unit employed by the print apparatus 31, and transfers the print job.

In addition, if the destination of the print job to be transferred is the print apparatus 30, the controller 10 converts the paper size in a unit of $1/14400$ inches to a paper size in inches, which is the unit employed by the print apparatus 30, and transfers the print job.

However, in the calculation for different unit conversion, information that has been subjected to unit conversion, the information regarding the paper size or position for aftertreatment, inevitably includes a conversion error.

Figure 3:
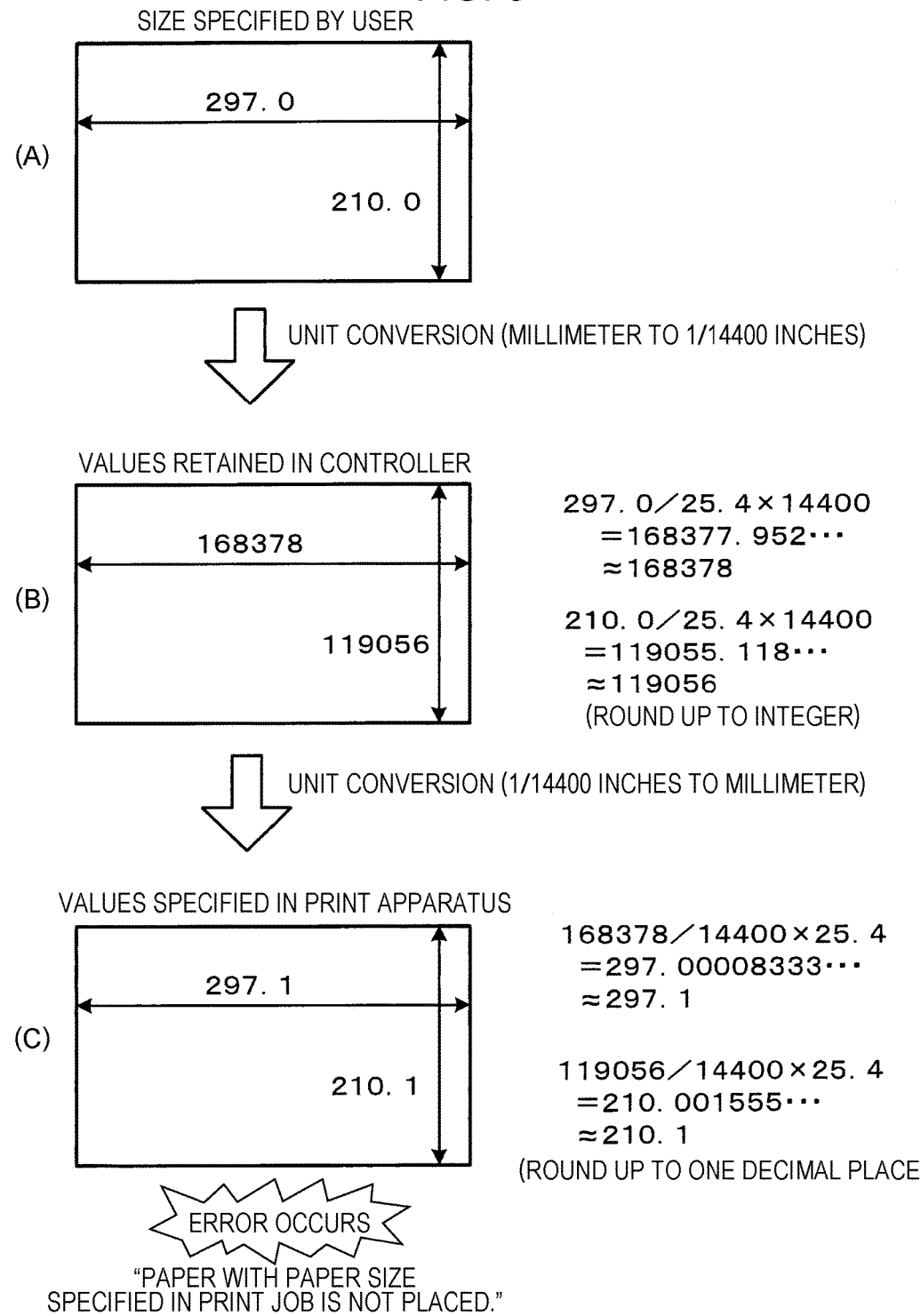
FIG. 3 illustrates a conversion error that occurs as a result of unit conversion at the time of specifying a paper size.
Figure 4:
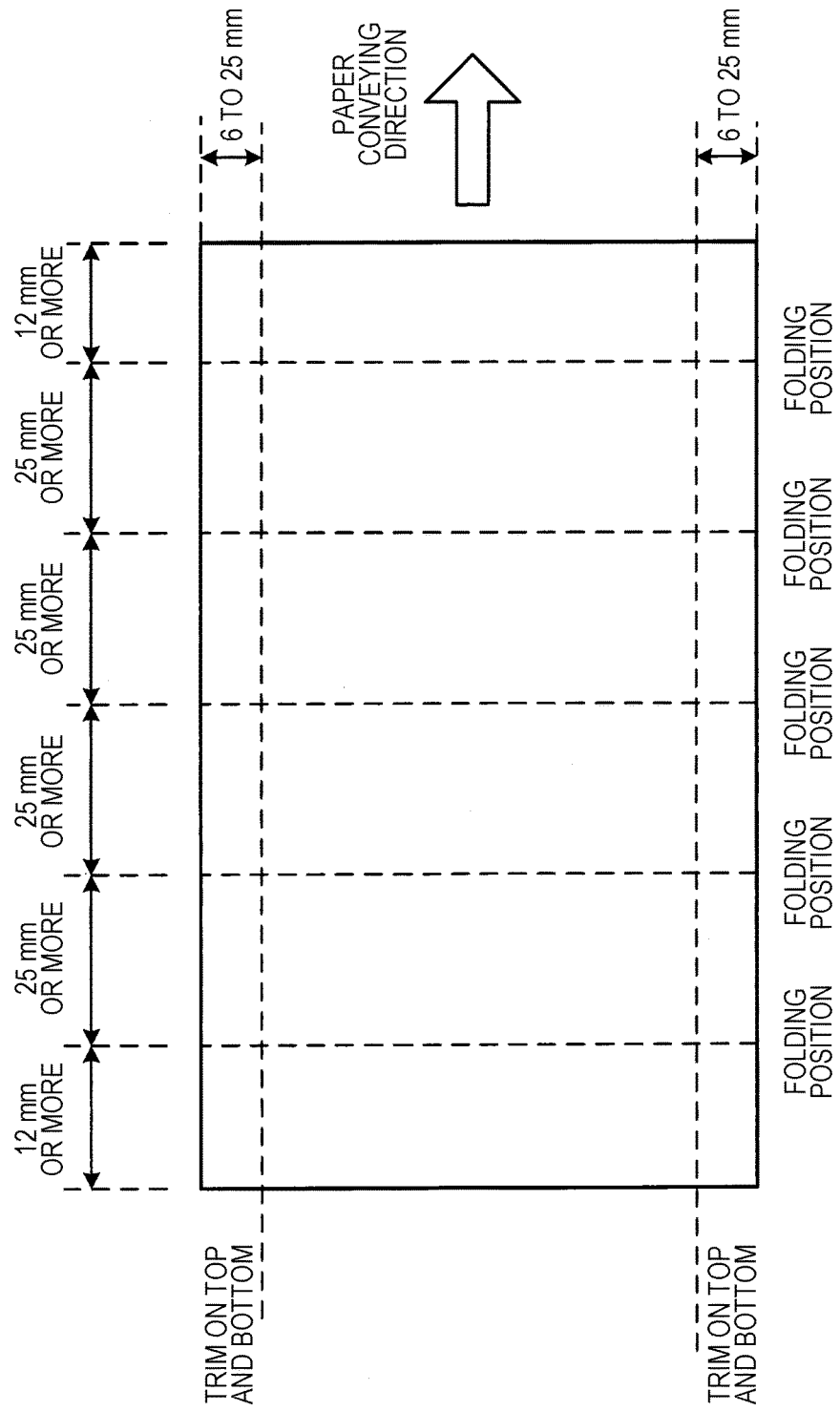
FIG. 4 illustrates an exemplary prohibited dimension range (prohibited range) in which aftertreatment is prohibited.
Figure 5:
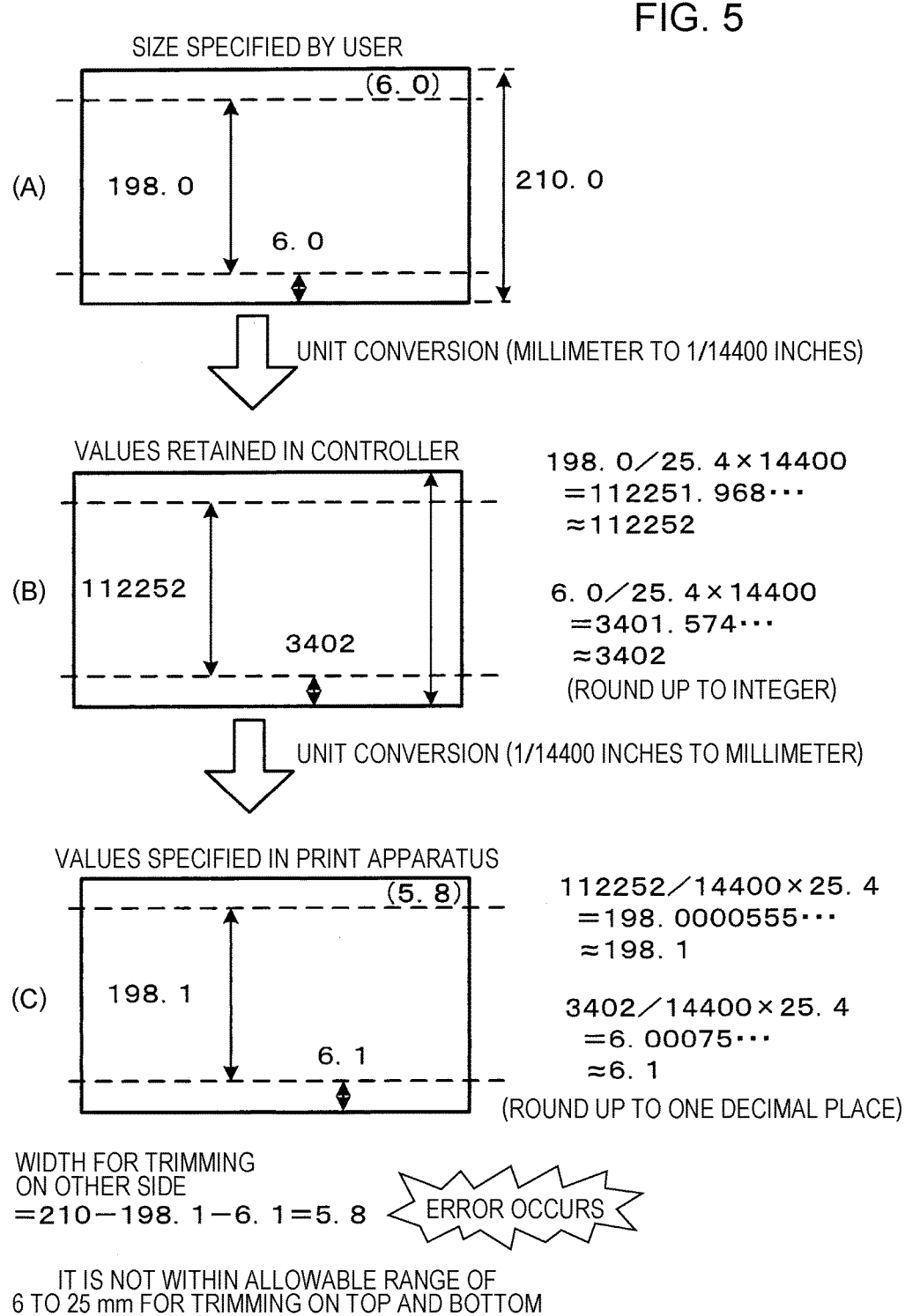
FIG. 5 illustrates a conversion error that occurs as a result of unit conversion at the time of specifying a position for aftertreatment.

Accordingly, even when the print apparatuses 30 and 31 are instructed to perform print processing after simple unit conversion of the information regarding the paper size or position for aftertreatment, problems may arise. With reference to FIG. 3 through FIG. 5, exemplary cases will be described in which problems arise when a print system to which the present invention is not applied performs unit conversion of the information regarding the paper size or position for aftertreatment.

For example, an exemplary case where print processing is interrupted will be described with reference to FIG. 3. In this case, although the paper size employed by a print apparatus is specified in a print job, paper with the size matching the print apparatus is not present, and thus the print processing is interrupted.

It is assumed that a user generates, in a terminal apparatus, a print job in which a paper size of 297.0×210.0 millimeters is specified, for example, and transmits the print job to the controller, as illustrated in part (A) of FIG. 3.

Then, the controller converts a paper size of 297.0×210.0 millimeters to a paper size in a unit of $1/14400$ inches, which is the unit employed by the controller. Here, since 1 inch equals 25.4 mm, specifically, as illustrated in part (B) of FIG. 3, the paper size is converted to a paper size in a unit of $1/14400$ inches according to the following expression.

$$297.0/25.4 \times 14400 = 168377.952 \ldots \approx 168378$$

$$210.0/25.4 \times 14400 = 119055.118 \ldots \approx 119056$$

Here, since integers as the values indicating the paper size are retained in the controller, the numbers are rounded up to integers.

Then, if a print apparatus for which the paper size is specified in millimeters is instructed to perform print processing, the controller converts the paper size in a unit of $1/14400$ inches to a paper size in millimeters again. Specifically, by performing the following calculation, as illustrated in part (C) of FIG. 3, the paper size in a unit of $1/14400$ inches is converted to a paper size in millimeters.

$$168378/14400 \times 25.4 = 297.00008333 \ldots \approx 297.1$$

$$119056/14400 \times 25.4 = 210.001555 \ldots \approx 210.1$$

Here, since the controller specifies the paper size in a unit of 0.1 millimeters for the print apparatus, the numbers are rounded up to one decimal place.

However, paper with a size of 297.1×210.1 millimeters is not present in the print apparatus. Accordingly, an error occurs in the controller, and the screen of the controller displays, for example, the indication saying that paper with the paper size specified in the print job is not placed. Thus, the print processing is temporarily interrupted.

Other exemplary cases where an error occurs and the print processing is interrupted will be described with reference to FIGS. 4 and 5. In these exemplary cases, if aftertreatment, such as trimming the top and bottom, trimming the fore edge of a booklet, or folding, is specified in the print job, although the specified position for aftertreatment is not within a prohibited range, it is determined by the controller that a value in the prohibited range is specified.

First, an exemplary prohibited dimension range in which aftertreatment is prohibited will be described with reference to FIG. 4.

In the exemplary prohibited dimension range illustrated in FIG. 4, in a process for trimming the top and bottom in which the upper and lower edges of the paper are trimmed, it is possible to specify the trimming positions in ranges of 6 to 25 mm from the paper edges, and values smaller than 6 mm and larger than 25 mm are prohibited from being specified.

In addition, in folding, folding positions are specified at positions that are 12 mm or more away from leading and trailing edges of paper, and the interval between adjacent folding positions is specified as 25 mm or more.

If the prohibited dimension range is set as illustrated in FIG. 4, for example, it is assumed that the user has specified the positions for trimming the top and bottom as illustrated in part (A) of FIG. 5 in the terminal apparatus.

Here, if widths as positions for trimming the top and bottom are specified by the user, the user is supposed to specify a finished dimension. The following description will exemplify the case illustrated in FIG. 5 where the paper width is 210.0 millimeters and the finished dimension is specified as 198.0 millimeters.

Accordingly, since the widths for trimming the top and bottom are calculated to be equal to each other, each width is calculated to be 6.0 millimeters (=(210.0−198.0)/2).

Accordingly, the terminal apparatus transmits an instruction to the controller, the instruction including information indicating that the finished dimension is 198.0 millimeters and information indicating that one of the widths for trimming the top and bottom is 6.0 millimeters.

Then, the controller converts the information regarding the specification of the positions for trimming the top and bottom, which are 198.0 millimeters and 6.0 millimeters, to values in a unit of 1/14400 inches employed by the controller. Here, since 1 inch equals to 25.4 mm, specifically, as illustrated in part (B) of FIG. 5, the paper size is converted to a paper size in a unit of 1/14400 inches according to the following expression.

$$198.0/25.4 \times 14400 = 112251.968 \ldots \approx 112252$$

$$6.0/25.4 \times 14400 = 3401.574 \ldots \approx 3402$$

Here, since integers as the values indicating the paper size are retained in the controller, the numbers are rounded up to integers.

Then, if a print apparatus for which the paper size is specified in millimeters is instructed to perform print processing, the controller converts the paper size in a unit of 1/14400 inches to a paper size in millimeters again. Specifically, by performing the following calculation, as illustrated in part (C) of FIG. 5, the paper size in a unit of 1/14400 inches is converted to a paper size in millimeters.

$$112252/14400 \times 25.4 = 198.0000555 \ldots \approx 198.1$$

$$3402/14400 \times 25.4 = 6.00075 \ldots \approx 6.1$$

Here, since the controller specifies the paper size in a unit of 0.1 millimeters for the print apparatus, the numbers are rounded up to one decimal place.

Then, from the paper width being 210.0 millimeters, the finished dimension being 198.1 millimeters, and one of the widths for trimming the top and bottom being 6.1 millimeters, the other of the widths for trimming the top and bottom is calculated to be 5.8 millimeters (=210.0−198.1−6.1).

However, since the allowable range of each of the widths for trimming the top and bottom is set to a range of 6 to 25 millimeters in the print apparatus, the trimming width of 5.8 millimeters is in the prohibited range. Accordingly, an error occurs in the controller, and the print processing is temporarily interrupted.

Accordingly, upon reception of the print job from the terminal apparatus 20 in which the paper size or position for aftertreatment is specified, the controller 10 according to this exemplary embodiment does not simply perform unit conversion of the information regarding the paper size or information regarding the position for aftertreatment, but performs a process described later in order to perform unit conversion of the information regarding the unit employed by the print apparatus 30 or the print apparatus 31.

Figure 6:
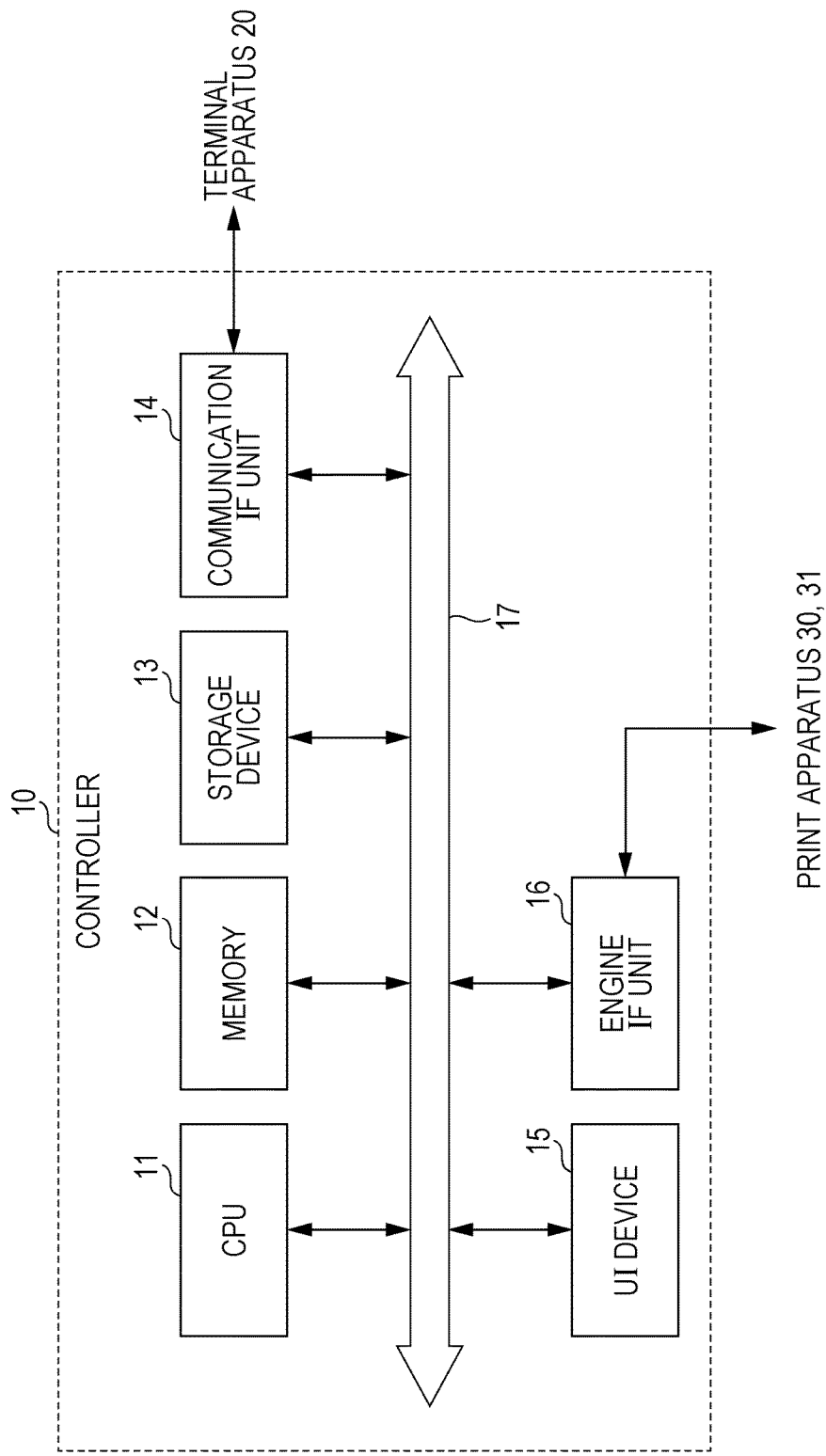
FIG. 6 illustrates a hardware configuration of a controller according to the first exemplary embodiment of the present invention.

Next, a hardware configuration of the controller 10 in the print system according to this exemplary embodiment will be described with reference to FIG. 6. As illustrated in FIG. 6, the controller 10 according to this exemplary embodiment includes a central processing unit (CPU) 11, a memory 12, a storage device 13, such as a hard disk drive (HDD), a communication interface (IF) unit 14 that transmits and receives data to and from the terminal apparatus 20 via a network, a user interface (UI) device 15 including a touch screen or a liquid crystal display, and an engine IF unit 16 that transmits and receives data to and from the print apparatus 30. In addition, the CPU 11, the memory 12, the storage device 13, the communication IF unit 14, the UI device 15, and the engine IF unit 16 are connected to one another via a control bus 17.

The CPU 11 performs a predetermined process on the basis of a print control program stored in the memory 12 or the storage device 13 and controls operations of the controller 10. Although this exemplary embodiment has described that the CPU 11 reads out and executes a control program stored in the memory 12 or the storage device 13, the program may be stored in a conveyable storage medium, such as a compact disk read only memory (CD-ROM), and may be provided to the CPU 11.

Figure 7:
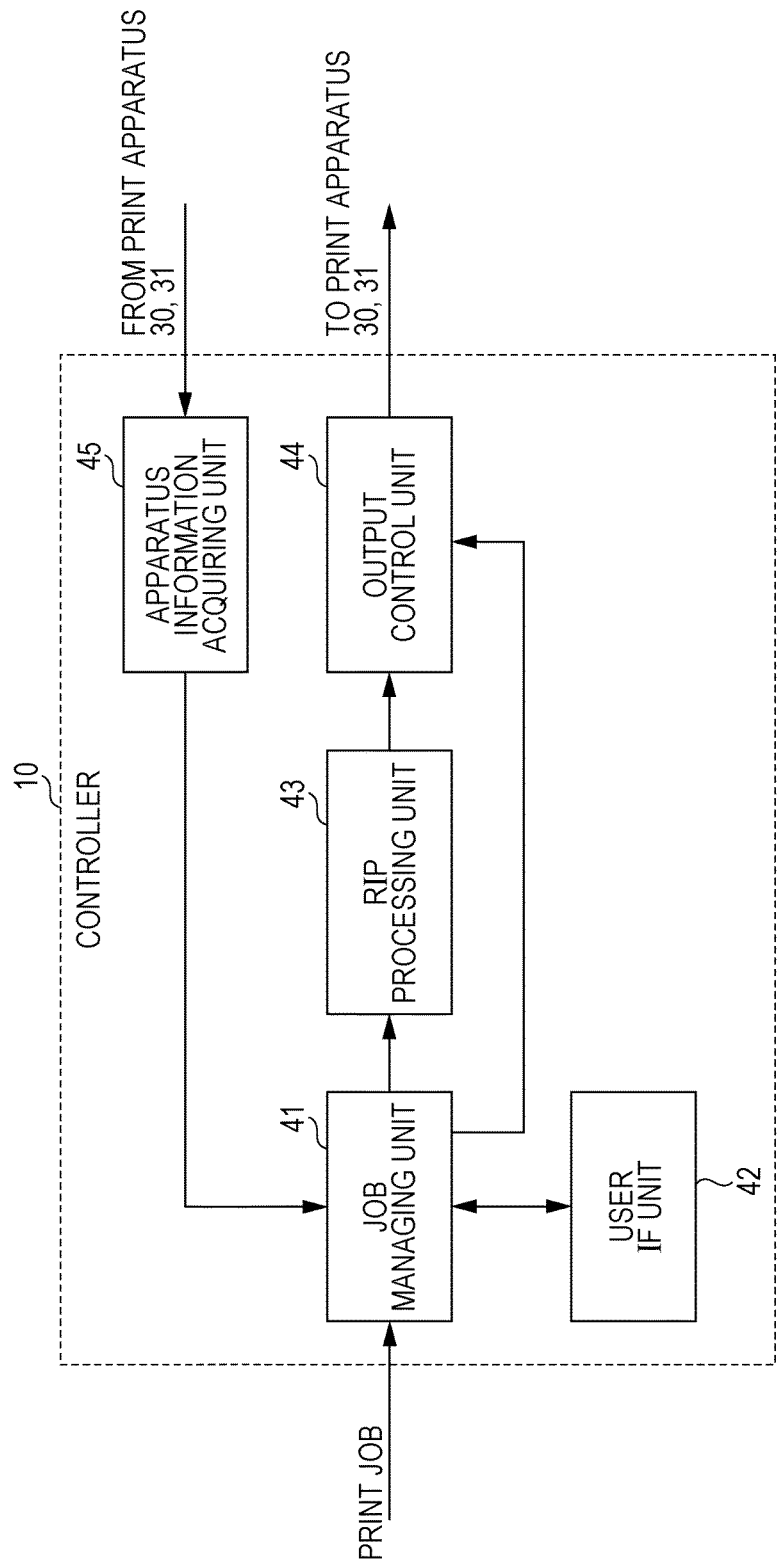
FIG. 7 is a block diagram illustrating a functional configuration of the controller according to the first exemplary embodiment of the present invention.

FIG. 7 is a block diagram illustrating a functional configuration of the controller 10 realized by the above control program being executed.

As illustrated in FIG. 7, the controller 10 according to this exemplary embodiment includes a job managing unit 41, a user IF unit 42, a raster image processing (RIP) unit 43, an output control unit 44, and an apparatus information acquiring unit 45.

The job managing unit 41 receives a print job (print instruction) transmitted from the terminal apparatus 20 and controls print processing based on the received print job.

Specifically, upon reception of the print job, the job managing unit 41 notifies the RIP unit 43 of a rasterization instruction. Then, the RIP unit 43 notified of the rasterization instruction rasterizes the print job to generate print data in units of pages.

Then, the output control unit 44 transfers the print data generated by the RIP unit 43 in units of pages to the print apparatus 30 or 31 in a sequential manner, thereby controlling the output of the print apparatus 30 or 31 on the basis of the print job.

In addition, the job managing unit 41 converts the paper size (paper dimension) in the unit (first unit) specified by a user in the received print job to a paper size in a unit (second unit) of $1/14400$ inches, which is a unit different from the unit specified by the user and unique to the controller 10.

Then, the job managing unit 41 converts the converted paper size in a unit of $1/14400$ inches to a paper size in the unit (third unit) employed by the print apparatus 30 (or the print apparatus 31) that is to perform print processing.

If the received print job includes specification about aftertreatment, the job managing unit 41 converts information regarding a position for aftertreatment in the unit (first unit) specified by the user in the received print job to information in a unit (second unit) of $1/14400$ inches, which is a unit different from the unit specified by the user and unique to the controller 10.

Then, the job managing unit 41 converts the converted information regarding the position for aftertreatment in a unit of $1/14400$ inches to information in the unit employed by the print apparatus 30 (or the print apparatus 31) that is to perform print processing.

The apparatus information acquiring unit 45 acquires, from the print apparatus 30 or 31, a list of standard paper sizes (standard-paper-size list information) in the unit employed by the print apparatus 30 or 31, or information regarding the unit employed by the print apparatus 30 or 31. FIG. 8 illustrates exemplary standard-paper-size list information acquired in this manner.

FIG. 8 illustrates an exemplary case where the apparatus information acquiring unit 45 has acquired the standard-paper-size list information from the print apparatus 31 employing the millimeter. According to the list information illustrated in FIG. 7, lengths of the short and long sides are illustrated in millimeters for each of the standard sheets of paper including A6, A5, and A4 sheets. In addition, this list information also includes information regarding the orientation of each of the standard sheets of paper. Here, in the information regarding the orientation of the sheets of paper, "short edge feed" (SEF) means that paper is fed and placed longitudinally, and "long edge feed" (LEF) means that paper is fed and placed laterally.

The user IF unit 42, for example, displays system conditions to the user and receives contents of various settings from the user. In this example, the user inputs tolerance values through the user IF unit 42 in the controller 10 according to this exemplary embodiment, and the user IF unit 42 sets the input tolerance values in the job managing unit 41.

Figure 9:
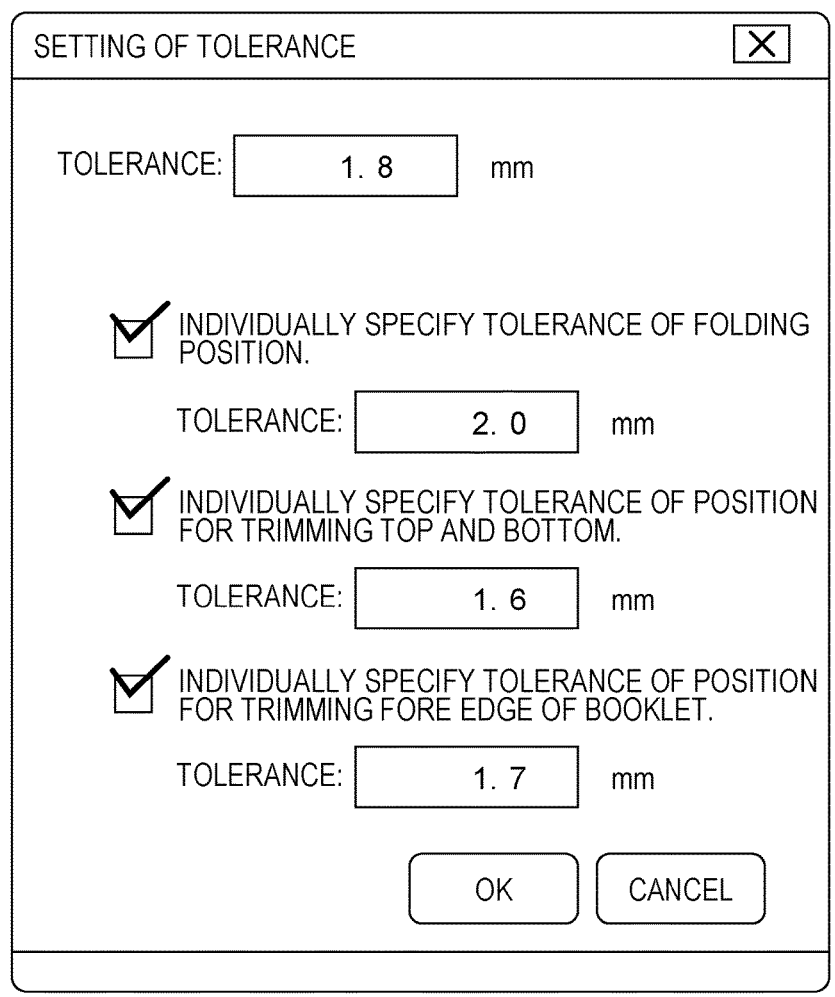
FIG. 9 illustrates an exemplary screen displayed at the time of setting tolerance.

For example, the user IF unit 42 displays the screen illustrated in FIG. 9, and the user inputs, through the user IF unit 42, tolerance values for determining allowed degrees of conversion errors resulting from unit conversion.

The exemplary displayed screen in FIG. 9 illustrates the case where 1.8 mm is set as common tolerance, and 2.0 mm, 1.6 mm, and 1.7 mm are independently and respectively set as the tolerance of the folding position, the tolerance of the position for trimming the top and bottom, and the tolerance of the position for trimming the fore edge of a booklet.

Then, from the standard-paper-size list information acquired by the apparatus information acquiring unit 45, the job managing unit 41 selects a standard paper size that matches, within the preset tolerance range, the converted paper size in the unit employed by the print apparatus 30 or 31.

If the converted information regarding the position for aftertreatment in the unit employed by the print apparatus 30 or 31 is included in the preset prohibited range and the difference from the boundary of the prohibited range is within the preset tolerance range, the job managing unit 41 modifies the information regarding the position for aftertreatment to be the boundary value of the prohibited range.

The job managing unit 41 notifies the RIP unit 43 and the output control unit 44 of the information regarding the paper size selected from the standard-paper-size list information.

In addition, the job managing unit 41 notifies the output control unit 44 of the information regarding the position for aftertreatment specified in the print job or the modified information regarding the position for aftertreatment, which has been modified to be the boundary value of the prohibited range.

The RIP unit 43 generates print data in a sequential manner on the basis of the print job received by the job managing unit 41. Specifically, the RIP unit 43 performs rasterization processing on the print job received by the job managing unit 41, thereby generating rasterized print data in units of pages. At this time, the RIP unit 43 generates the print data by performing rasterization processing on the print job on the basis of the paper size selected by the job managing unit 41.

In addition, the output control unit 44 specifies the standard paper size selected by the job managing unit 41 and controls the output of the print apparatus 30 (or the print apparatus 31) on the basis of the print data generated by the RIP unit 43.

In addition, the output control unit 44 specifies the information regarding the position for aftertreatment, which has been modified by the job managing unit 41, and controls the output of the print apparatus 30 (or the print apparatus 31) on the basis of the print data generated by the RIP unit 43.

Next, operations of the controller 10 according to this exemplary embodiment will be described in detail with reference to drawings.

Figure 10:
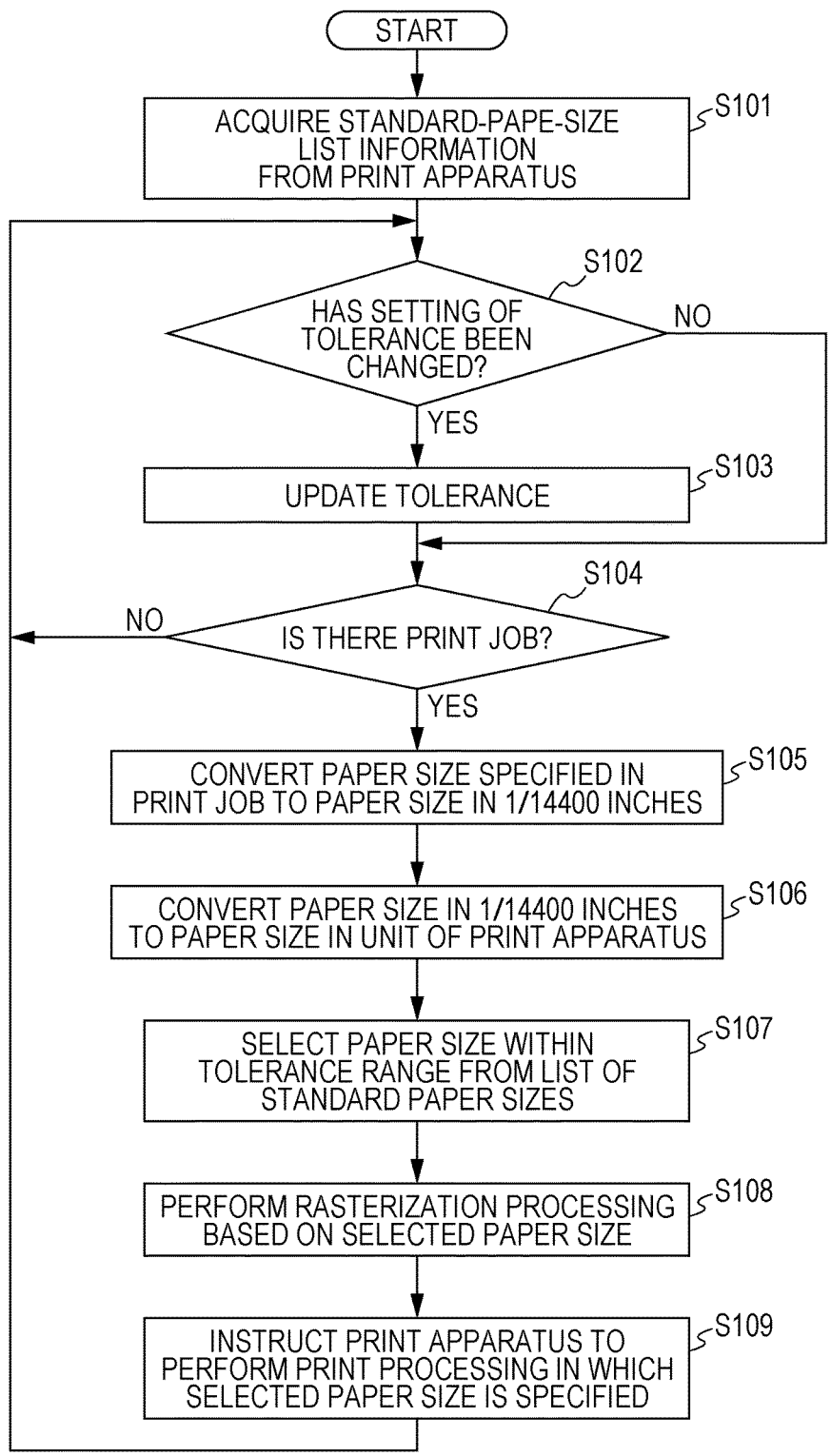
FIG. 10 is a flowchart illustrating a process for specifying a paper size in the controller according to the first exemplary embodiment of the present invention.

First, processes for specifying the paper size in the controller 10 according to this exemplary embodiment will be described with reference to the flowchart in FIG. 10.

Figure 11:
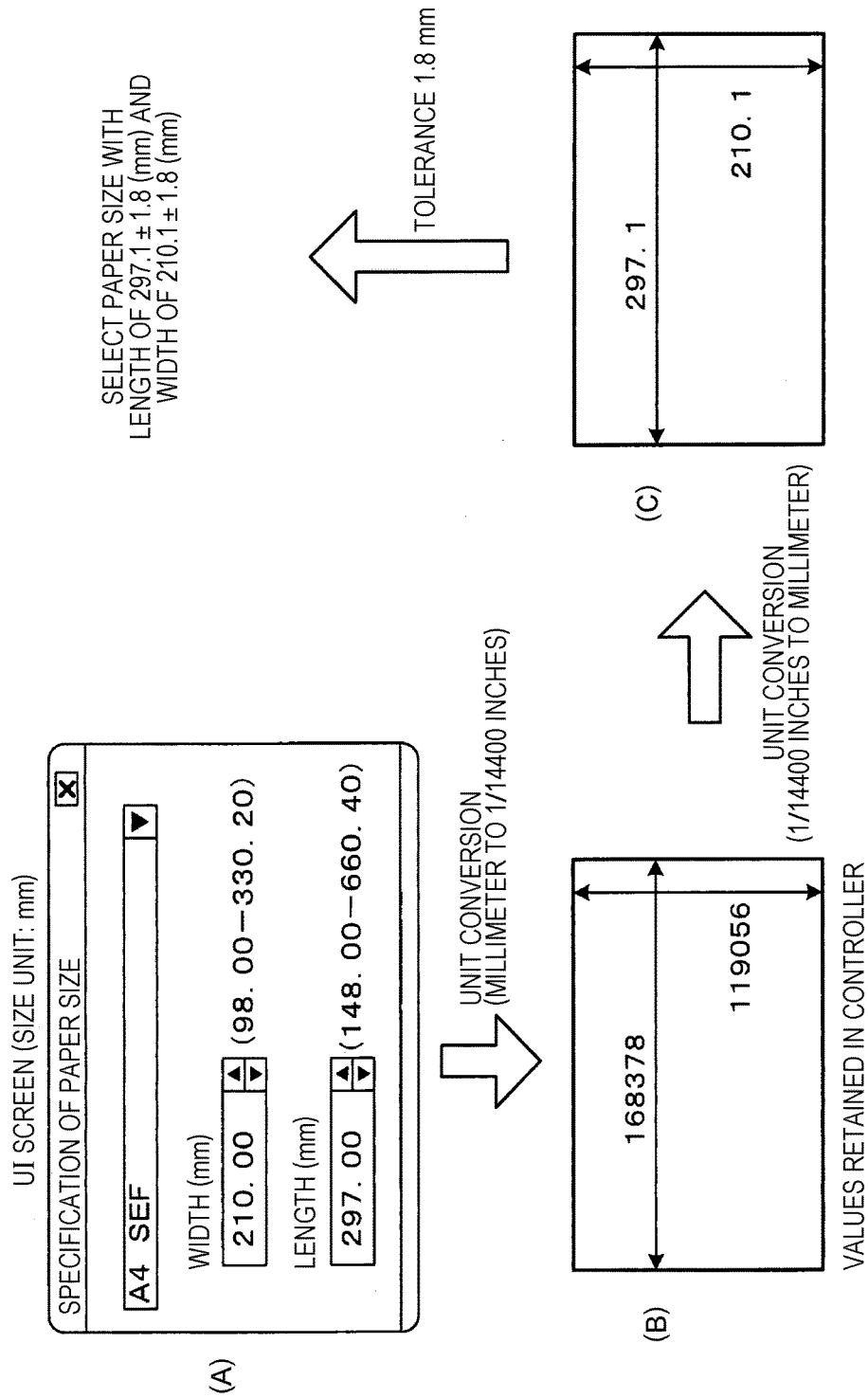
FIG. 11 illustrates a specific exemplary process for specifying a paper size according to the first exemplary embodiment.
Figure 12:
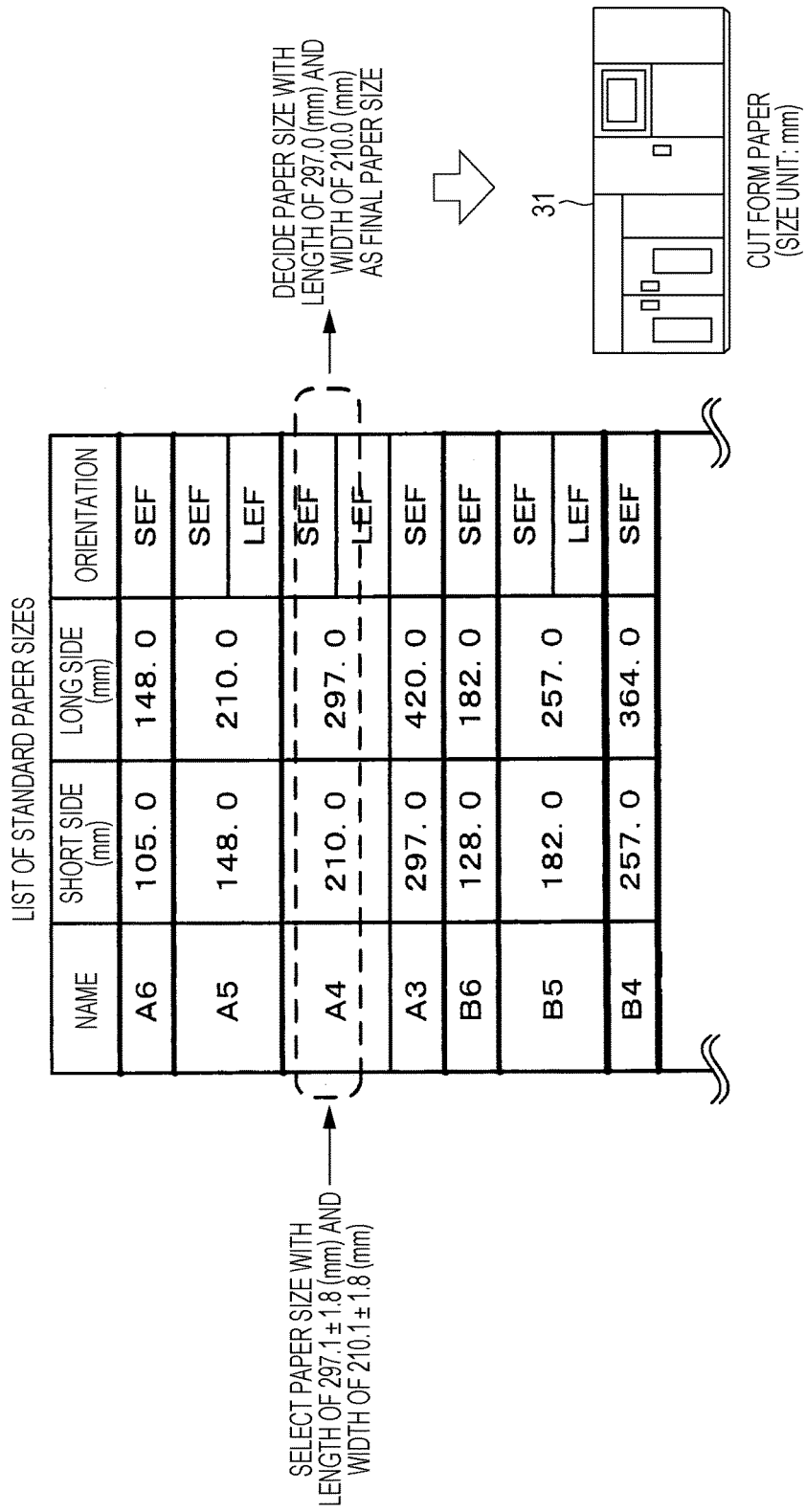
FIG. 12 illustrates a specific exemplary process for specifying a paper size according to the first exemplary embodiment.

Here, specific exemplary processes for specifying the paper size are illustrated in FIGS. 11 and 12. FIGS. 11 and 12 illustrate the case where the paper size specified by the user is in millimeters and where the print apparatus 31, which receives specification of the paper size in millimeters, is instructed to perform print processing.

First, the apparatus information acquiring unit 45 acquires, from the print apparatus 31, standard-paper-size list information, such as the list illustrated in FIG. 8, and notifies the job managing unit 41 of the list information (step S101).

Here, if the setting of the tolerance has been changed on the interface screen (YES in step S102), such as the screen illustrated in FIG. 9, the job managing unit 41 updates the changed contents of the setting of the tolerance in the job managing unit 41 (step S103).

Then, if there is a print job to be done (YES in step S104), the job managing unit 41 converts the paper size specified in the print job to a paper size in a unit of $1/14400$ inches (step S105).

In this example, as illustrated in part (A) of FIG. 11, since 210.0×297.0 (mm) has been specified by the user as the paper size, the job managing unit 41 converts this paper size in millimeters to a paper size in a unit of 1/14400 inches, and a paper size of 168378×119056 (1/14400 inches) is retained in the controller 10.

Then, the controller 10 performs various controls by using information regarding the paper size in a unit of 1/14400 inches as long as the errors in the paper size do not matter.

Then, the job managing unit 41 converts the paper size in a unit of 1/14400 inches to a paper size in the size unit employed by the print apparatus (step S106). Since the print apparatus 31 employing the millimeter is instructed to perform print processing in this example, the job managing unit 41 converts the paper size in a unit of 1/14400 inches to a paper size in millimeters as illustrated in part (C) of FIG. 11.

It is understood in part (C) of FIG. 11 that the paper size is converted to 210.1×297.1 (mm) as a result of conversion errors between different size units.

Then, from the standard-paper-size list information for the print apparatus 31 acquired by the apparatus information acquiring unit 45, the job managing unit 41 selects a paper size that matches, within the tolerance range, the converted paper size in millimeters (step S107).

Specifically, as illustrated in FIG. 12, the job managing unit 41 selects a paper size that matches, within the set tolerance range of 1.8 mm, the converted paper size of 210.1×297.1 (mm) in millimeters from the list information.

Since there is an A4 SEF standard sheet of paper having a size of 210.0×297.0 (mm) in the standard-paper-size list information in this example, the job managing unit 41 selects the standard paper size of 210.0×297.0 (mm). Then, the job managing unit 41 notifies the RIP unit 43 and the output control unit 44 of the information regarding the selected paper size.

Accordingly, the RIP unit 43 performs rasterization processing on the basis of the selected paper size (step S108). In addition, the output control unit 44 causes the print apparatus 31 to perform print processing in which the selected paper size is specified (step S109).

Figure 13:
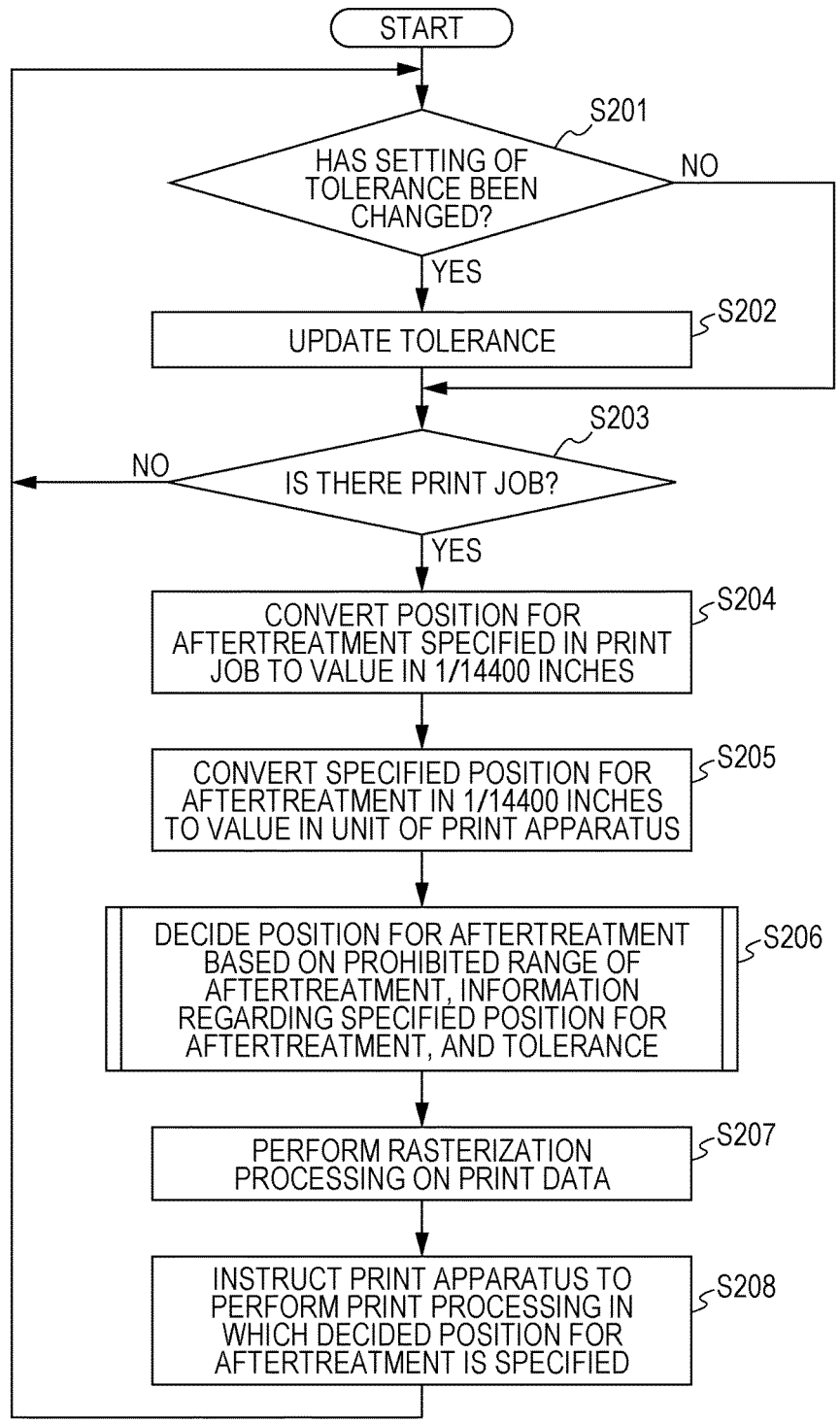
FIG. 13 is a flowchart illustrating a process for specifying a position for aftertreatment in the controller according to the first exemplary embodiment of the present invention.
Figure 14:
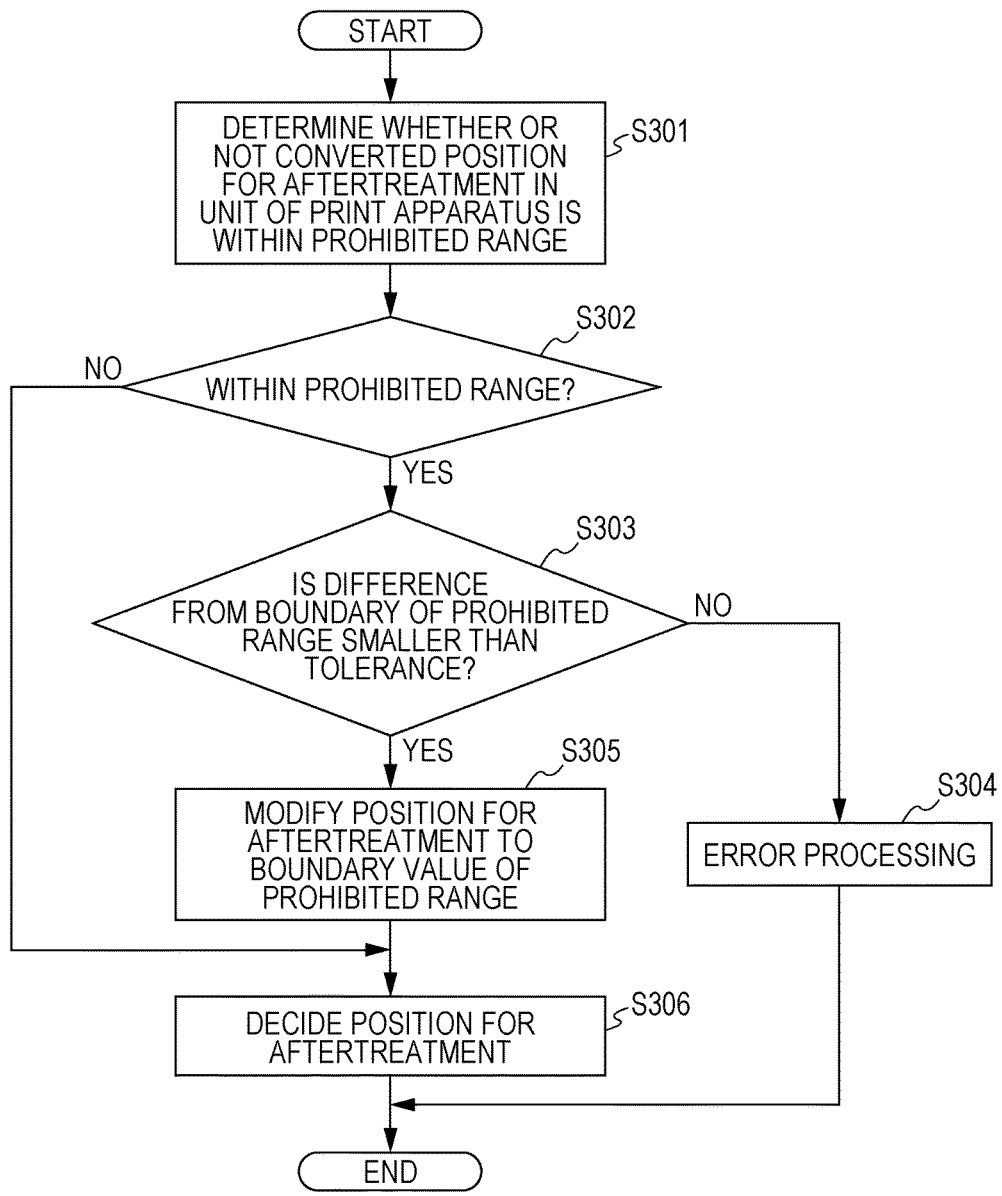
FIG. 14 is a flowchart illustrating details of a step for determining the position for aftertreatment, the step being illustrated in FIG. 13.

Next, processes for specifying a position for aftertreatment in the controller 10 according to this exemplary embodiment will be described with reference to the flowcharts in FIGS. 13 and 14.

Figure 15:
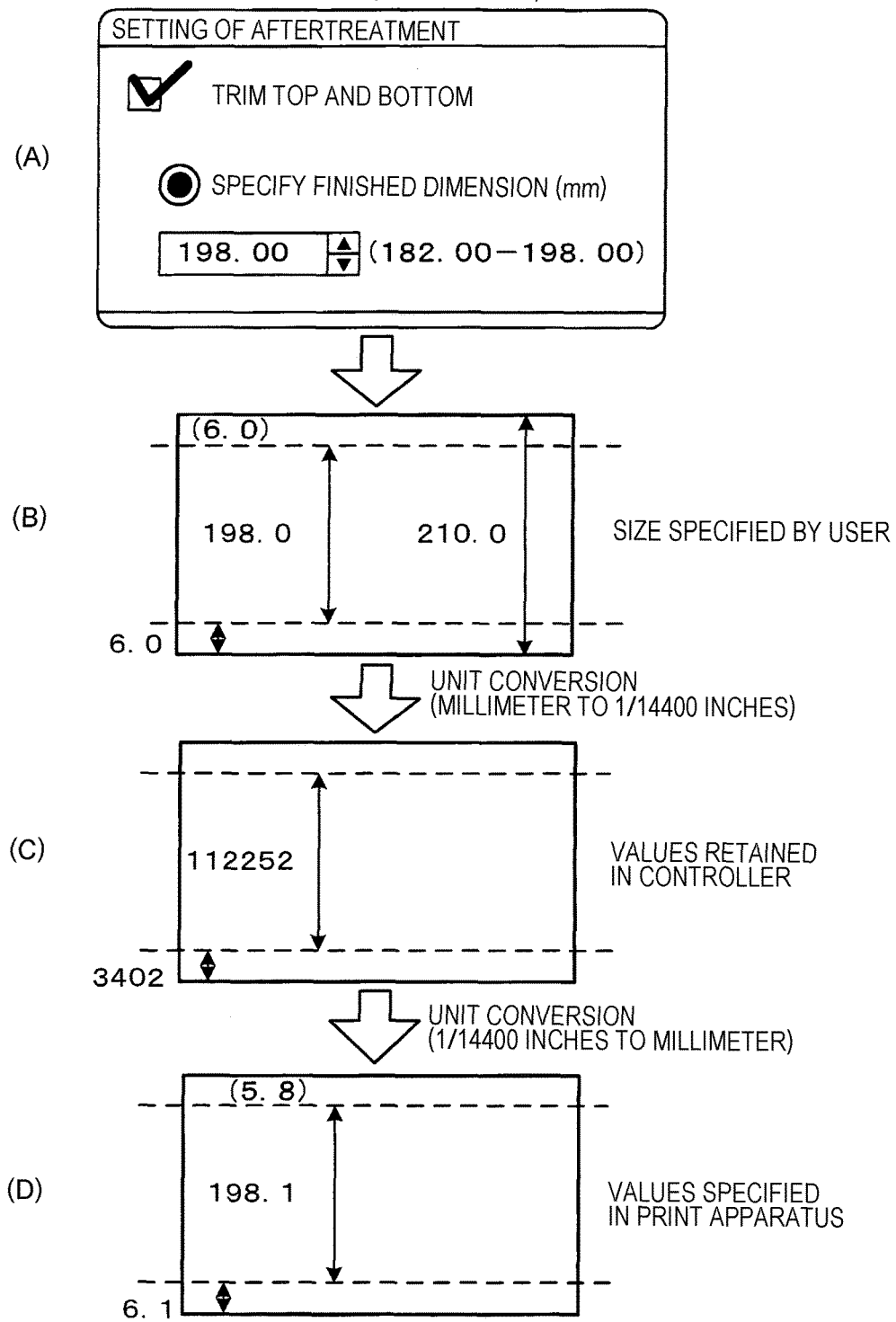
FIG. 15 illustrates a specific exemplary case of specification for trimming the top and bottom for a print apparatus as an example of the process for specifying a position for aftertreatment according to the first exemplary embodiment.
Figure 16:
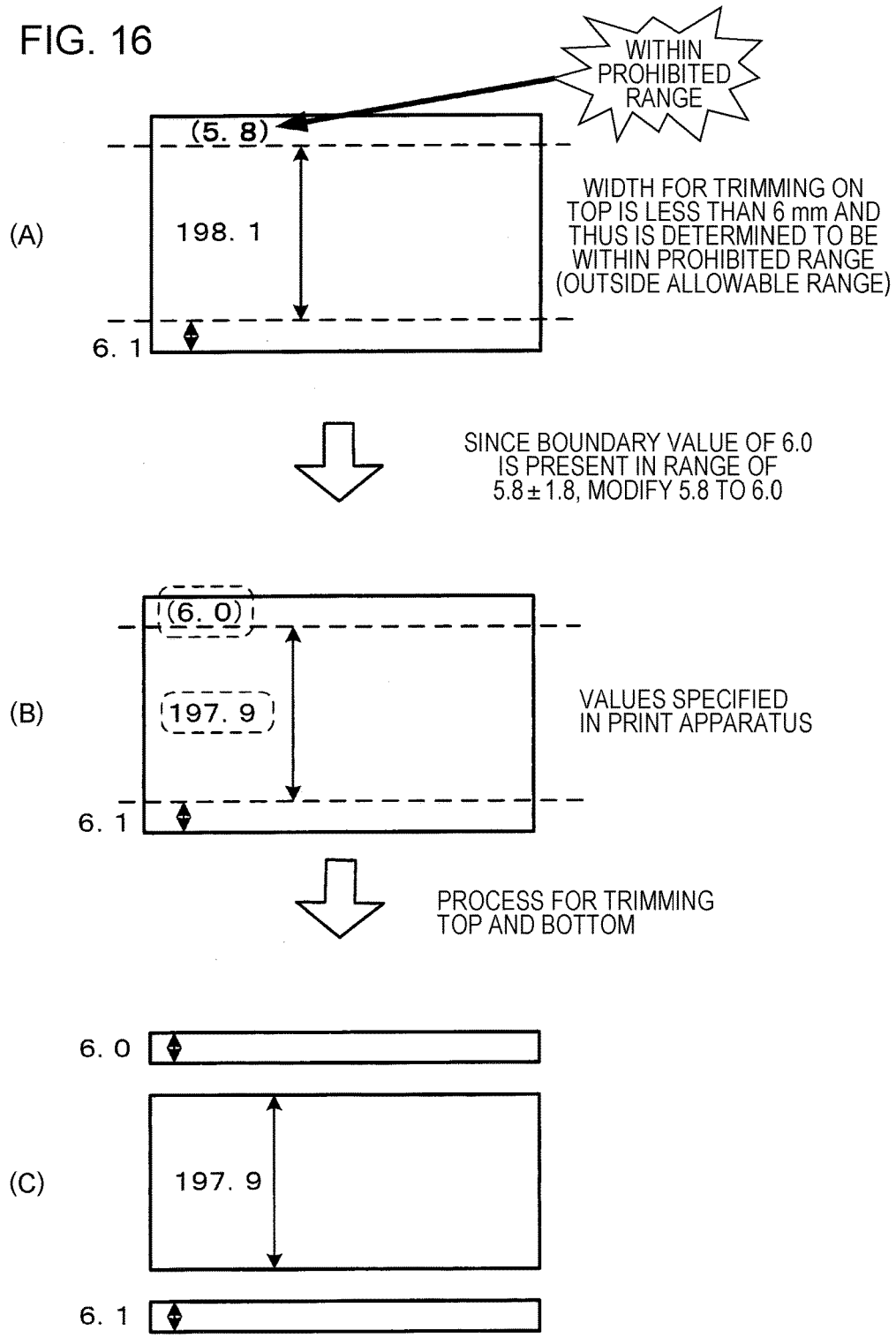
FIG. 16 illustrates a specific exemplary case of specification for trimming the top and bottom for a print apparatus as an example of the process for specifying a position for aftertreatment according to the first exemplary embodiment.

Here, FIGS. 15 and 16 illustrate a specific exemplary case of specification for trimming the top and bottom for the print apparatus 31 as an exemplary process for specifying a position for aftertreatment. In the case of FIGS. 15 and 16, one of the widths for trimming the top and bottom specified by the user is in millimeters, and the print apparatus 31, which receives the specified one of the widths for trimming the top and bottom in millimeters, is instructed to perform print processing.

First, if the setting of the tolerance has been changed on the interface screen (YES in step S201), such as the screen illustrated in FIG. 9, the job managing unit 41 updates the changed contents of the setting of the tolerance (step S202).

Then, if there is a print job to be done (YES in step S203), the job managing unit 41 converts the one of the widths for trimming the top and bottom specified in the print job to a value in a unit of 1/14400 inches (step S204).

Since 198.0 (mm) has been specified by the user as a finished dimension for a width obtained by trimming the top and bottom and the paper width is 210.0 (mm) as illustrated in part (A) of FIG. 15, this specification corresponds to the case where each of the widths for trimming the top and bottom of 6.0 (mm) (=(210.0−198.0)/2) has been specified as illustrated in part (B) of FIG. 15.

Then, the job managing unit 41 converts 198.0 (mm) and 6.0 (mm) specified by the user to values in a unit of 1/14400 inches, whereby 112252 and 3402 (1/14400 inches) are retained in the controller 10 as the specified positions for trimming the top and bottom as illustrated in part (C) of FIG. 15.

Then, the job managing unit 41 converts the paper size in a unit of 1/14400 inches to a paper size in the size unit employed by the print apparatus (step S205). In this example, since the print apparatus 31 employing the millimeter is instructed to perform print processing, the job managing unit 41 converts the paper size in a unit of 1/14400 inches to a paper size in millimeters as illustrated in part (D) of FIG. 15.

It is understood in part (D) of FIG. 15 that the specified positions for trimming the top and bottom are converted to 198.1 (mm) and 6.1 (mm) as a result of conversion errors between different size units.

In this example, since only the information indicating that one of the widths for trimming the top and bottom is 6.1 (mm) is retained in the controller 10 as the information regarding the widths for trimming the top and bottom, the other of the widths for trimming the top and bottom is calculated to be 5.8 (mm) (=210.0 (width of sheet)−198.1 (finished dimension)−6.1 (one of widths for trimming top and bottom)) as illustrated in part (A) of FIG. 16.

Accordingly, the job managing unit 41 determines that it is not possible to instruct the print apparatus to trim the top and bottom without modification, and performs a process for modifying and deciding the specified positions for trimming the top and bottom on the basis of the prohibited range of the position for trimming the top and bottom, the information regarding the specified positions for trimming the top and bottom, and information regarding the tolerance (step S206).

Specifically, the job managing unit 41 determines whether or not a converted specified position for trimming the top and bottom in millimeters, which is the unit employed by the print apparatus 31, is within the prohibited range (step S301). If it is determined that the specified position is within the prohibited range (YES in step S302), the job managing unit 41 determines whether or not the difference between the boundary of the prohibited range and the specified position is smaller than the tolerance (step S303).

Then, if it is determined that the difference between the boundary of the prohibited range and the specified position is not smaller than the tolerance (NO in step S303), the job managing unit 41 cancels the print processing by performing error processing indicating an error of the specification of the position for aftertreatment (step S304).

Then, if it is determined that the difference between the boundary of the prohibited range and the specified position is smaller than the tolerance (YES in step S303), the job managing unit 41 modifies the specified position for aftertreatment to be the boundary value of the prohibited range (step S305). Then, the job managing unit 41 determines that the modified position for trimming the top and bottom as the final position for trimming the top and bottom specified for the print apparatus 31 (step S306).

Specifically, the job managing unit 41 modifies the other of the widths for trimming the top and bottom of 5.8 (mm), which is illustrated in part (A) of FIG. 16, to be 6.0 mm as illustrated in part (B) of FIG. 16. Accordingly, it is understood that the finished dimension of the sheet of paper after the process for trimming the top and bottom is 197.9 (mm) (=210.0−6.1−6.0).

Then, the job managing unit 41 notifies the output control unit 44 of the information regarding the finally decided positions for trimming the top and bottom.

Then, after the rasterization processing has been performed by the RIP unit 43 (step S207), the output control unit 44 instructs the print apparatus 31 to perform print processing in which the positions for trimming the top and bottom are specified according to the notification from the job managing unit 41 (step S208).

As illustrated in part (C) of FIG. 16, with this processing, it is understood that the specified process for trimming the top and bottom is performed in the print apparatus 31, one of the trimmed widths is 6.0 (mm), the other of the trimmed widths is 6.1 (mm), and the finished dimension of the sheet of paper is 197.9 (mm).

It is noted that, the job managing unit 41 may modify the other of the widths for trimming the top and bottom of 5.8 (mm) to be 6.1 (mm), instead of 6.0 (mm), so as to correspond to the one of the widths for trimming the top and bottom.

Second Exemplary Embodiment

Next, a controller 10a according to a second exemplary embodiment of the present invention will be described.

Figure 17:
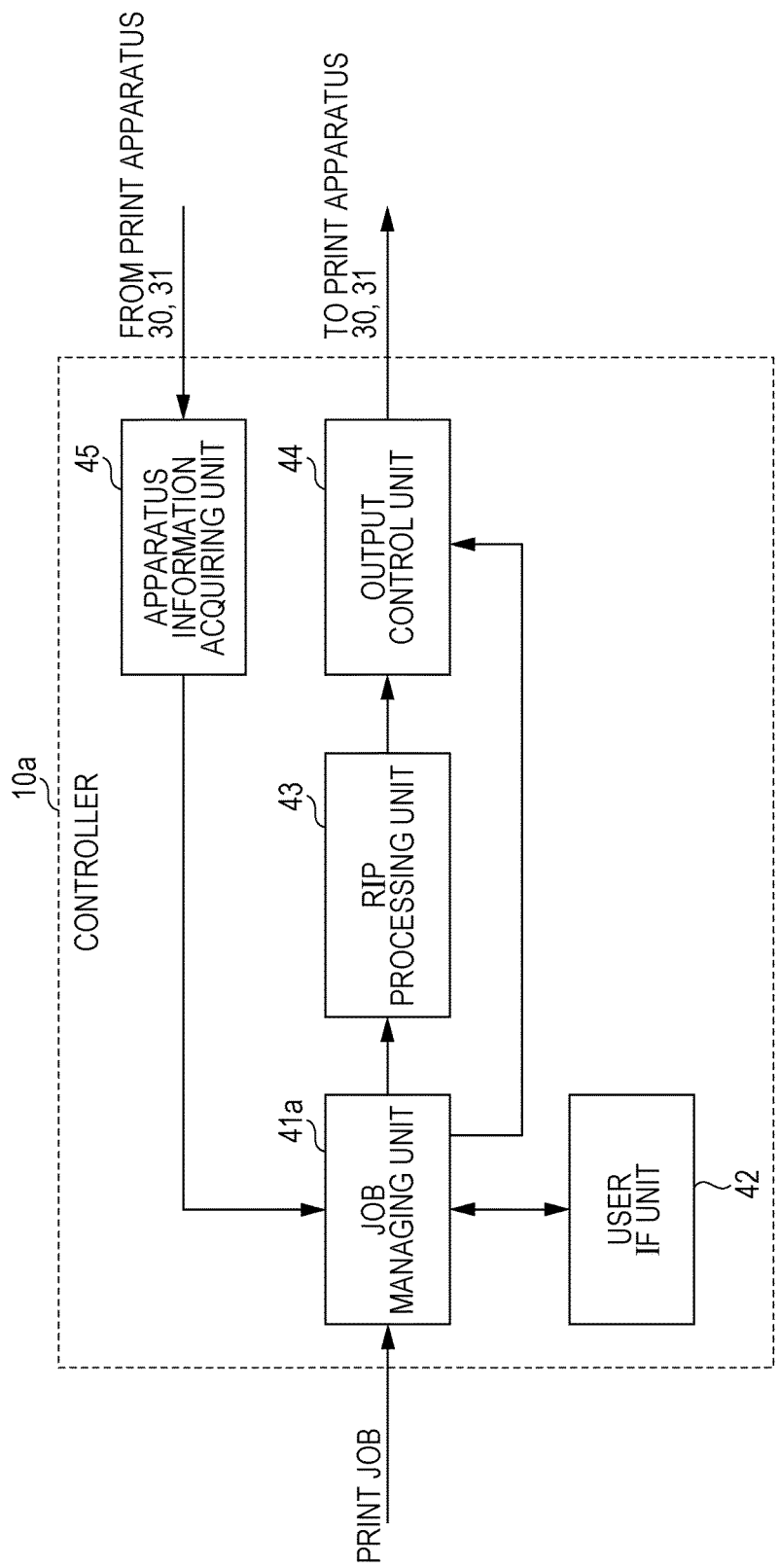
FIG. 17 is a block diagram illustrating a functional configuration of a controller according to a second exemplary embodiment of the present invention.

FIG. 17 is a block diagram illustrating a functional configuration of the controller 10a according to this exemplary embodiment.

The controller 10a according to this exemplary embodiment is different from the controller 10 according to the first exemplary embodiment illustrated in FIG. 7 in that the job managing unit 41 is replaced by a job managing unit 41a. It is noted that like reference numerals denote like components in FIG. 7 and FIG. 17, and description thereof will be omitted.

The job managing unit 41a according to this exemplary embodiment has the functions of the above-described job managing unit 41 according to the first exemplary embodiment, and in addition, retains information regarding the paper size specified by the user or information regarding the position for aftertreatment. If the size unit employed by the print apparatus 30 or 31 that is instructed to perform print processing is the same as the size unit according to the information regarding the paper size specified by the user or information regarding the position for aftertreatment, the job managing unit 41a decides the information specified by the user as information to be transmitted without any modification as the instruction for the print apparatus.

For example, if the paper size specified by the user is in millimeters and the size unit employed by the print apparatus that is instructed to perform print processing is the millimeter, the controller 10a according to this exemplary embodiment transmits without any modification the information regarding the paper size specified by the user to the print apparatus as the instruction.

It is noted that if the size unit specified by the user is different from the size unit employed by the print apparatus, a process that is the same as or similar to that in the above-described first exemplary embodiment is performed.

With such a process, if the size unit (first unit) specified by the user is the same as the size unit (third unit) employed by the print apparatus, the output control unit 44 according to this exemplary embodiment specifies dimensions of a sheet of paper in the size unit specified by the user; if the size unit specified by the user is different from the size unit employed by the print apparatus, the output control unit 44 according to this exemplary embodiment specifies a standard paper size selected from standard-paper-size list information and controls the output of the print apparatus on the basis of print data generated by the RIP unit 43.

In addition, if the size unit (first unit) specified by the user is the same as the size unit (third unit) employed by the print apparatus, the output control unit 44 according to this exemplary embodiment specifies the information regarding the position for aftertreatment in the size unit specified by the user; and if the size unit specified by the user is different from the size unit employed by the print apparatus, the output control unit 44 specifies the information regarding the position for aftertreatment that has been modified by the job managing unit 41 and controls the output of the print apparatus on the basis of print data generated by the RIP unit 43.

Next, operations of the controller 10a according to this exemplary embodiment will be described below in detail with reference to a drawing.

Figure 18:
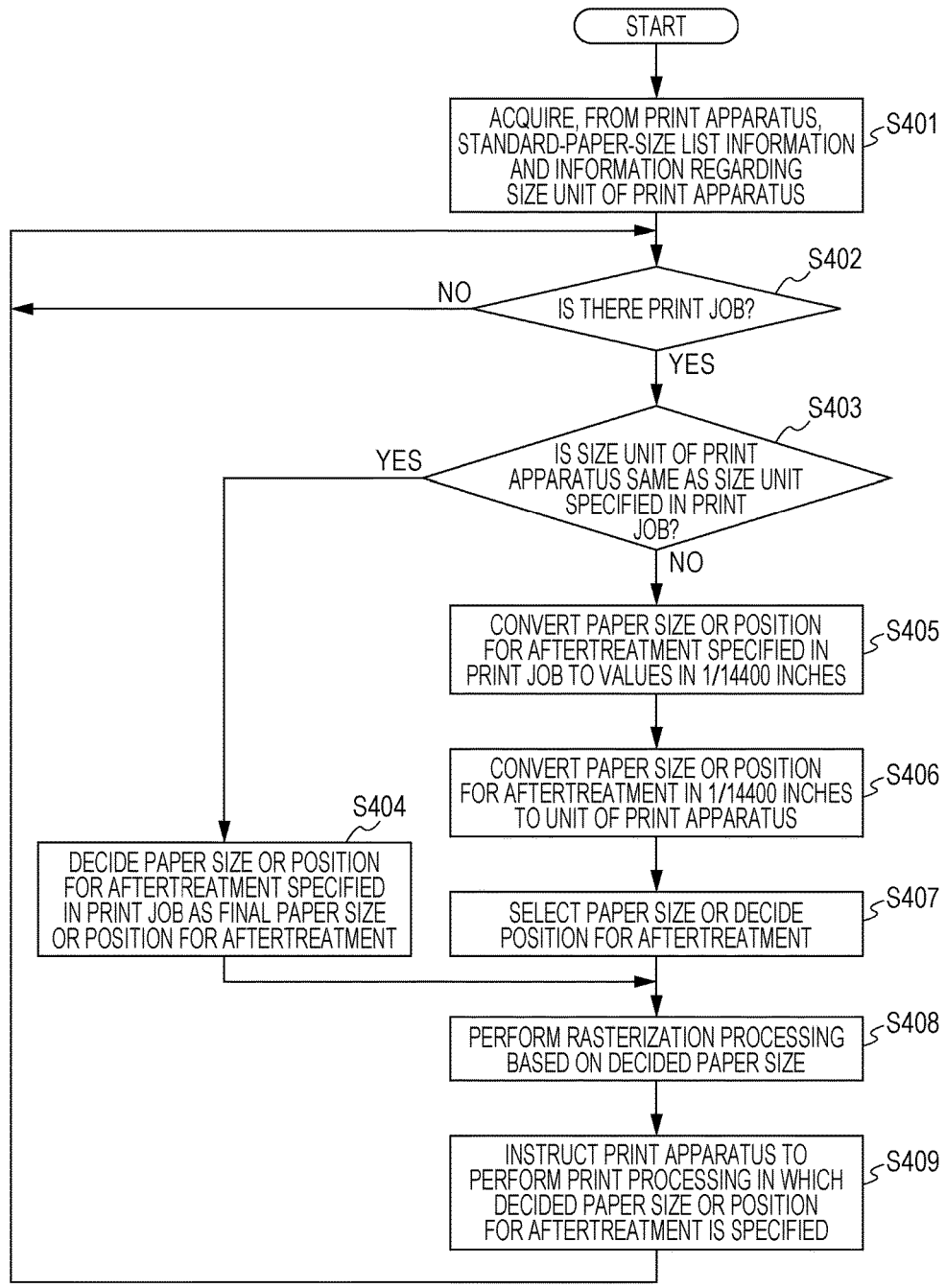
FIG. 18 is a flowchart illustrating a process for specifying a paper size and for specifying a position for aftertreatment in the controller according to the second exemplary embodiment of the present invention.

A process for specifying a paper size or position for aftertreatment in the controller 10a according to this exemplary embodiment will be described with reference to the flowchart in FIG. 18.

First, the apparatus information acquiring unit 45 acquires, from the print apparatus 31, standard-paper-size list information, such as the list illustrated in FIG. 8, or information regarding the size unit employed by the print apparatus 31, and notifies the job managing unit 41 of such information (step S401).

Then, if there is a print job to be done (YES in step S402), the job managing unit 41a determines whether or not the size unit employed by the print apparatus is the same as the size unit specified in the print job (step S403).

Then, if it is determined that the size unit employed by the print apparatus is the same as the size unit specified in the print job (YES in step S403), the job managing unit 41a decides the paper size or position for aftertreatment specified in the print job as the final paper size or position for aftertreatment (step S404).

Accordingly, the RIP unit 43 performs rasterization processing on the basis of the decided paper size (step S408), and the output control unit 44 specifies the decided paper size or position for aftertreatment and instructs the print apparatus to perform print processing (step S409).

In addition, if it is determined that the size unit employed by the print apparatus is different from the size unit specified in the print job (NO in step S403), the job managing unit 41a converts the paper size or position for aftertreatment specified in the print job to a value in a unit of $1/14400$ inches (step S405).

Then, the job managing unit 41a converts the paper size or position for aftertreatment in a unit of $1/14400$ inches to a value in the size unit employed by the print apparatus (step S406).

Then, by a method that is the same as or similar to the above-described method according to the first exemplary embodiment, the job managing unit 41a selects the paper size or decides the position for aftertreatment (step S407).

Then, the RIP unit 43 performs rasterization processing on the basis of the decided paper size (step S408), and the output control unit 44 instructs the print apparatus to perform print processing in which the decided paper size or position for aftertreatment is specified (step S409).

Next, FIG. 19 illustrates a specific exemplary case where the print apparatus 31 is instructed to trim the top and bottom as an exemplary process for specifying the position for aftertreatment. FIG. 19 illustrates the case where the widths for trimming the top and bottom specified by the user are in millimeters and where the print apparatus 31, which receives the specification of the widths for trimming the top and bottom in millimeters, is instructed to perform print processing.

Here, as illustrated in part (A) of FIG. 19, the user has specified 198.0 (mm) as the finished dimension for a width obtained by trimming the top and bottom, and the paper width is 210.0 (mm). Thus, it is assumed that 6.0 (mm) (=(210.0−198.0)/2) has been specified in the print job as each of the widths for trimming the top and bottom.

The job managing unit 41a converts the specified positions for trimming the top and bottom, which are 198.0 (mm) and 6.0 (mm), to values in a unit of 1/14400 inches. Accordingly, as illustrated in part (B) of FIG. 19, the controller 10a retains 112252 and 3402 (1/14400 inches) as specified positions for trimming the top and bottom and 198.0 (mm) and 6.0 (mm), which have been specified in the print job, as the specified positions for trimming the top and bottom.

Then, if the size unit specified in the print job is the same as the size unit employed by the print apparatus, as illustrated in part (C) of FIG. 19, the size unit specified in the print job is used without any modification, and the print apparatus is instructed to perform print processing with the following specification of positions: each of the widths for trimming the top and bottom being 6.0 (mm) and the finished dimension being 198.0 (mm).

If the size unit specified in the print job is different from the size unit employed by the print apparatus, as illustrated in part (D) of FIG. 19, a value in the size unit specified in the print job is converted to a value in a unit of 1/14400 inches, which is the unit employed by the controller, by a method such as the method described in the first exemplary embodiment. Then, the value in a unit of 1/14400 inches is converted again to a value in inches, which is the unit employed by the print apparatus, and then the print apparatus is instructed to perform print processing. For example, the print apparatus is instructed to perform print processing with the following specification of positions: the widths for trimming the top and bottom being 0.23 (inches) and 0.24 (inches) and the finished dimension being 7.7 (inches).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
a receiving unit that receives a print instruction;
a first converting unit that converts a dimension of a sheet of paper specified in a first unit in the print instruction received by the receiving unit to a dimension of a sheet of paper in a second unit that is different from the first unit;
a second converting unit that converts the dimension of the sheet of paper in the second unit to a dimension of a sheet of paper in a third unit, the dimension in the second unit having been obtained by the conversion by the first converting unit, the third unit being employed by a print apparatus that is to perform print processing;
an acquiring unit that acquires, from the print apparatus, information regarding a list of standard dimensions of sheets of paper in the third unit that is employed by the print apparatus;
a selecting unit that selects, from the information regarding the list of standard dimensions of sheets of paper acquired by the acquiring unit, a standard dimension of a sheet of paper that matches, within a preset range of tolerance, the dimension of the sheet of paper in the third unit obtained by the conversion by the second converting unit;
a generating unit that generates print data by processing the print instruction, received by the receiving unit, by using the standard dimension of the sheet of paper selected by the selecting unit; and
an output controller that specifies the standard dimension of the sheet of paper selected by the selecting unit to control output of the print apparatus on the basis of the print data generated by the generating unit.

2. A print control apparatus comprising:
a receiving unit that receives a print instruction;
a first converting unit that converts information regarding a position for aftertreatment specified in a first unit in the print instruction received by the receiving unit to information in a second unit that is different from the first unit;
a second converting unit that converts the information regarding the position for aftertreatment in the second unit to information regarding the position for aftertreatment in a third unit, the information in the second unit having been obtained by the conversion by the first converting unit, the third unit being employed by a print apparatus that is to perform print processing;
a modifying unit that modifies the information regarding the position for aftertreatment in the third unit to be a value on a boundary of a preset prohibited range if the information regarding the position for aftertreatment in the third unit having been obtained by the conversion by the second converting unit is included in the prohibited range and a difference from the boundary of the prohibited range is within a preset range of tolerance;
a generating unit that generates print data by processing the print instruction received by the receiving unit; and
an output controller that specifies the information regarding the position for aftertreatment that has been modified by the modifying unit to control output of the print apparatus on the basis of the print data generated by the generating unit.

3. The print control apparatus according to claim 1, wherein the output controller specifies the dimension of the sheet of paper specified in the first unit if the first unit is same as the third unit.

4. A print control apparatus comprising:
a receiving unit that receives a print instruction;
a first converting unit that converts information regarding a position for aftertreatment specified in a first unit in the print instruction received by the receiving unit to information in a second unit that is different from the first unit;
a second converting unit that converts the information regarding the position for aftertreatment in the second unit to information regarding the position for aftertreatment in a third unit, the information in the second unit having been obtained by the conversion by the first converting unit, the third unit being employed by a print apparatus that is to perform print processing;

a modifying unit that modifies the information regarding the position for aftertreatment in the third unit to be a value on a boundary of a preset prohibited range if the information regarding the position for aftertreatment in the third unit having been obtained by the conversion by the second converting unit is included in the prohibited range and a difference from the boundary of the prohibited range is within a preset range of tolerance;

a generating unit that generates print data by processing the print instruction received by the receiving unit; and an output controller that specifies the information regarding the position for aftertreatment specified in the first unit if the first unit is same as the third unit, and specifies the information regarding the position for aftertreatment that has been modified by the modifying unit to control output of the print apparatus on the basis of the print data generated by the generating unit if the first unit is different from the third unit.

5. The print control apparatus according to claim 1, further comprising a setting unit that sets the tolerance.

6. The print control apparatus according to claim 2, further comprising a setting unit that sets the tolerance.

7. The print control apparatus according to claim 3, further comprising a setting unit that sets the tolerance.

8. The print control apparatus according to claim 4, further comprising a setting unit that sets the tolerance.

9. A print control method comprising:

receiving a print instruction;

performing first conversion of converting a dimension of a sheet of paper specified in a first unit in the received print instruction to a dimension of a sheet of paper in a second unit that is different from the first unit;

performing second conversion of converting the dimension of the sheet of paper in the second unit to a dimension of a sheet of paper in a third unit, the dimension in the second unit having been obtained by the first conversion, the third unit being employed by a print apparatus that is to perform print processing;

acquiring, from the print apparatus, information regarding a list of standard dimensions of sheets of paper in the third unit that is employed by the print apparatus;

selecting, from the acquired information regarding the list of standard dimensions of sheets of paper, a standard dimension of a sheet of paper that matches, within a preset range of tolerance, the dimension of the sheet of paper in the third unit obtained by the second conversion;

generating print data by processing the received print instruction by using the selected standard dimension of the sheet of paper; and specifying the selected standard dimension of the sheet of paper to control output of the print apparatus on the basis of the generated print data.

10. A print control method comprising:

receiving a print instruction;

performing first conversion of converting information regarding a position for aftertreatment specified in a first unit in the received print instruction to information in a second unit that is different from the first unit;

performing second conversion of converting the information regarding the position for aftertreatment in the second unit to information regarding the position for aftertreatment in a third unit, the information in the second unit having been obtained by the first conversion, the third unit being employed by a print apparatus that is to perform print processing;

modifying the information regarding the position for aftertreatment in the third unit to be a value on a boundary of a preset prohibited range if the information regarding the position for aftertreatment in the third unit having been obtained by the second conversion is included in the prohibited range and a difference from the boundary of the prohibited range is within a preset range of tolerance;

generating print data by processing the received print instruction; and specifying the modified information regarding the position for aftertreatment to control output of the print apparatus on the basis of the generated print data.

11. A non-transitory computer readable medium storing a program causing a computer to execute a process for print control, the process comprising:

receiving a print instruction;

performing first conversion of converting a dimension of a sheet of paper specified in a first unit in the received print instruction to a dimension of a sheet of paper in a second unit that is different from the first unit;

performing second conversion of converting the dimension of the sheet of paper in the second unit to a dimension of a sheet of paper in a third unit, the dimension in the second unit having been obtained by the first conversion, the third unit being employed by a print apparatus that is to perform print processing;

acquiring, from the print apparatus, information regarding a list of standard dimensions of sheets of paper in the third unit that is employed by the print apparatus;

selecting, from the acquired information regarding the list of standard dimensions of sheets of paper, a standard dimension of a sheet of paper that matches, within a preset range of tolerance, the dimension of the sheet of paper in the third unit obtained by the second conversion;

generating print data by processing the received print instruction by using the selected standard dimension of the sheet of paper; and specifying the selected standard dimension of the sheet of paper to control output of the print apparatus on the basis of the generated print data.

12. A non-transitory computer readable medium storing a program causing a computer to execute a process for print control, the process comprising:

receiving a print instruction;

performing first conversion of converting information regarding a position for aftertreatment specified in a first unit in the received print instruction to information in a second unit that is different from the first unit;

performing second conversion of converting the information regarding the position for aftertreatment in the second unit to information regarding the position for aftertreatment in a third unit, the information in the second unit having been obtained by the first conversion, the third unit being employed by a print apparatus that is to perform print processing;

modifying the information regarding the position for aftertreatment in the third unit to be a value on a boundary of a preset prohibited range if the information regarding the position for aftertreatment in the third unit having been obtained by the second conversion is included in the prohibited range and a difference from the boundary of the prohibited range is within a preset range of tolerance;

generating print data by processing the received print instruction; and specifying the modified information regarding the position for aftertreatment to control output of the print apparatus on the basis of the generated print data.

13. The non-transitory computer readable medium according to claim 11, wherein, in the specifying, the dimension of the sheet of paper specified in the first unit is specified if the first unit is same as the third unit.

14. A non-transitory computer readable medium storing a program causing a computer to execute a process for print control, the process comprising:

receiving a print instruction;

performing first conversion of converting information regarding a position for aftertreatment specified in a first unit in the received print instruction to information in a second unit that is different from the first unit;

performing second conversion of converting the information regarding the position for aftertreatment in the second unit to information regarding the position for aftertreatment in a third unit, the information in the second unit having been obtained by the first conversion, the third unit being employed by a print apparatus that is to perform print processing;

modifying the information regarding the position for aftertreatment in the third unit to be a value on a boundary of a preset prohibited range if the information regarding the position for aftertreatment in the third unit having been obtained by the second conversion is included in the prohibited range and a difference from the boundary of the prohibited range is within a preset range of tolerance;

generating print data by processing the received print instruction; and specifying the information regarding the position for aftertreatment specified in the first unit if the first unit is same as the third unit, and specifying the modified information regarding the position for aftertreatment to control output of the print apparatus on the basis of the generated print data if the first unit is different from the third unit.

* * * * *